(12) United States Patent
Liu et al.

(10) Patent No.: US 12,041,006 B2
(45) Date of Patent: Jul. 16, 2024

(54) DATA TRANSMISSION METHOD AND APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 531 days.

(21) Appl. No.: 17/213,484

(22) Filed: Mar. 26, 2021

(65) Prior Publication Data
US 2021/0218534 A1    Jul. 15, 2021

Related U.S. Application Data

(63) Continuation of application No. PCT/CN2019/108494, filed on Sep. 27, 2019.

(30) Foreign Application Priority Data

Sep. 28, 2018  (CN) .......................... 201811142553.5

(51) Int. Cl.
H04L 5/00     (2006.01)
H04W 72/0446  (2023.01)

(52) U.S. Cl.
CPC ....... *H04L 5/0053* (2013.01); *H04W 72/0446* (2013.01)

(58) Field of Classification Search
CPC ..... H04L 5/0053; H04L 5/0007; H04L 5/005; H04L 5/1469; H04L 5/0091;
(Continued)

(56) References Cited

U.S. PATENT DOCUMENTS

2013/0064169 A1   3/2013  Song et al.
2019/0007152 A1*  1/2019  Yi .......................... H04L 5/0028
(Continued)

FOREIGN PATENT DOCUMENTS

CN   102577293 A    7/2012
CN   105491666 A    4/2016
(Continued)

OTHER PUBLICATIONS

3GPP TSG RAN WG1 Meeting #92bis; R1-1804583; Source: LG Electronics; Title: Discussions on NR IAB support; Sanya, China, Apr. 16-20, 2018. (Year: 2018).*
(Continued)

*Primary Examiner* — Mohammed S Chowdhury

(57) ABSTRACT

This application provides a data transmission method and an apparatus, to improve resource utilization. The method includes: A first node obtains reference information, where the reference information includes information about a first subcarrier spacing and information about a first backhaul resource. The first node transmits data on a second backhaul resource by using a second subcarrier spacing, where the second backhaul resource includes one or more sub-resources, each of the one or more sub-resources includes M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource.

18 Claims, 15 Drawing Sheets

(58) Field of Classification Search
CPC ............ H04L 5/0078; H04W 72/0446; H04W 72/29; H04W 72/1263; H04W 72/27
See application file for complete search history.

(56) References Cited

U.S. PATENT DOCUMENTS

| | | | | |
|---|---|---|---|---|
| 2019/0089502 | A1* | 3/2019 | Yi | H04W 16/14 |
| 2019/0190687 | A1* | 6/2019 | Yi | H04L 5/1469 |
| 2021/0168798 | A1* | 6/2021 | Xu | H04W 72/27 |
| 2021/0377936 | A1* | 12/2021 | Yuan | H04W 72/27 |

FOREIGN PATENT DOCUMENTS

| | | |
|---|---|---|
| CN | 106304351 A | 1/2017 |
| CN | 106376050 A | 2/2017 |
| CN | 106455103 A | 2/2017 |
| CN | 107734672 A | 2/2018 |
| CN | 107889236 A | 4/2018 |
| WO | 2017213386 A1 | 12/2017 |
| WO | 2018012882 A1 | 1/2018 |

OTHER PUBLICATIONS

3GPP TSG RAN WG1 Meeting #93 ; R1-1806662; Source: Nokia, Nokia Shanghai Bell; Title: Dynamic resource allocation between backhaul and access links; Busan, Korea, May 21-25, 2018. (Year: 2018).*

3GPP TSG RAN WG1 Meeting #94 ; R1-1808580; Source: Nokia, Nokia Shanghai Bell; Title: Resource allocation between backhaul and access links; Gothenburg, Sweden, Aug. 20-24, 2018. (Year: 2018).*

3GPP TSG RAN WG1 Meeting #94bis; R1-1810675; Source: Nokia, Nokia Shanghai Bell; Title: Resource allocation/ coordination between Parent BH and Child links; Chengdu, China, Oct. 8-12, 2018. (Year: 2018).*

International Search Report and Written Opinion issued in PCT/CN2019/108494, dated Jan. 2, 2020, total 8 pages.

Nokia et al: "IAB Synchronization", 3GPP Draft; R1-1806664, May 21, 2018-May 25, 2018, 5 pages.

Nokia et al: "Resource allocation between backhaul and access links", 3GPP Draft; R1-1808580, Aug. 20, 2018-Aug. 24, 2018, 7 pages.

Extended European Search Report issued in EP19865571.4, dated Nov. 5, 2021, 11 pages.

ZTE, Sanechips, "Remaining issues for slot format", 3GPP TSG RAN WG1 Meeting AH 1801, R1-1800992, Vancouver, Canada, Jan. 22-26, 2018, 13 pages.

Office Action issued in CN201811142553.5, dated Sep. 1, 2021, 8 pages.

* cited by examiner

DATA TRANSMISSION METHOD AND APPARATUS

CROSS-REFERENCE TO RELATED APPLICATIONS

This application is a continuation of International Application No. PCT/CN2019/108494, filed on Sep. 27, 2019, which claims priority to Chinese Patent Application No. 201811142553.5, filed on Sep. 28, 2018. The disclosures of the aforementioned applications are hereby incorporated by reference in their entireties.

TECHNICAL FIELD

This application relates to the communications field, and more specifically, to a data transmission method and an apparatus.

BACKGROUND

With continuous development of mobile communications technologies, spectrum resources become increasingly insufficient. To improve spectrum utilization, base stations are to be deployed more densely in the future. In addition, dense deployment can avoid coverage holes. In a conventional cellular network architecture, a base station is connected to a core network through an optical fiber. However, deployment of optical fibers is costly in many scenarios. A wireless relay node (RN) establishes a connection to a core network through a wireless backhaul link, so that some costs of deployment of optical fibers can be reduced.

Generally, a relay node establishes a wireless backhaul link with one or more parent nodes, and accesses the core network through the parent node. The parent node may perform some control (for example, data scheduling, timing modulation, and power control) on the relay node through a plurality of types of signaling. In addition, the relay node may provide a service for a plurality of child nodes. A parent node of the relay node may be a base station or another relay node. A child node of the relay node may be a terminal, or may be another relay node.

A link through which the relay node communicates with the parent node is referred to as a backhaul link, and a link through which the relay node communicates with the child node is referred to as an access link. A relay node whose backhaul link and access link are in a same frequency band is referred to as an in-band relay. In LTE, a donor base station (donor) or an RN uses a fixed subcarrier spacing of 15 kHz bandwidth to transmit and receive data, and a backhaul link and an access link definitely have a same subcarrier spacing and a same symbol length. However, the NR protocol supports a plurality of types of subcarrier spacings, and a backhaul link and an access link may have different subcarrier spacings. An RN solution in LTE is not applicable to NR scenarios. Therefore, a transmission solution applicable to a relay node or an Integrated Access and Backhaul (IAB) node in a scenario of a plurality of types of subcarrier spacings needs to be proposed as soon as possible, to ensure or improve resource utilization.

SUMMARY

Example embodiments of this application provide a data transmission method and an apparatus, to transmit data on a second backhaul resource by using a second subcarrier spacing, so that resource utilization can be improved.

According to a first non-limiting aspect of an example embodiment, a data transmission method is provided. The method includes: A first node obtains reference information, where the reference information includes information about a first subcarrier spacing and information about a first backhaul resource. The first node transmits data on a second backhaul resource by using a second subcarrier spacing, where the second backhaul resource includes one or more sub-resources, each sub-resource includes M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource. The data is transmitted on the second backhaul resource, to improve resource utilization.

Optionally, M is less than or equal to a ratio of the second subcarrier spacing to the first subcarrier spacing. Herein, a value of M is determined based on the second subcarrier spacing and the first subcarrier spacing.

In an example embodiment, the sub-resource includes one or more time resources used for transmitting a demodulation reference signal (DMRS), and the method further includes: The first node sends the DMRS on the one or more time resources used for transmitting the DMRS.

Therefore, because the sub-resource includes the time resources used for transmitting the DMRS, the first node may send the DMRS signal by using the time resources.

Optionally, the one or more time resources used for transmitting the DMRS start from the $1^{st}$ available symbol of the sub-resource, and the available symbol is a symbol that can be used for transmitting data or a signal.

The time resource used for transmitting the DMRS may be located in some symbols of one or more resource units in the sub-resource. This is not limited in embodiments of the present disclosure.

In an example embodiment, that a first node obtains reference information includes: The first node receives the reference information from a second node. Optionally, the second node is a parent node of the first node.

Therefore, the first node may obtain the reference information by using signaling sent by the second node, and an obtaining manner is relatively flexible.

Optionally, the reference information may alternatively be predefined in a protocol, the first node does not need to obtain the reference information from another node, and an obtaining manner is relatively flexible.

Optionally, the reference information further includes an indication of a period of the first backhaul resource and an indication of a time domain position of the first backhaul resource. Therefore, the first node can learn of the second backhaul resource more accurately based on the indication of the period of the first backhaul resource and the indication of the time domain position of the first backhaul resource.

Optionally, the information about the first subcarrier spacing is carried in time division duplex (TDD) uplink and downlink configuration signaling. The TDD uplink and downlink configuration signaling is used to indicate TDD uplink and downlink configuration.

Optionally, the first subcarrier spacing may be the same as a reference subcarrier spacing used for the TDD uplink and downlink configuration.

Optionally, the second backhaul resource includes a slot used by the first node to send a synchronization signal block (SSB). Therefore, the method in this embodiment of this application is still applicable to a special slot.

In an example embodiment, a subcarrier spacing used for communication between the first node and a child node of the first node is greater than or equal to the first subcarrier spacing.

Optionally, the subcarrier spacing used for communication between the first node and the child node of the first node is the same as the first subcarrier spacing. Optionally, when the first node communicates with the child node of the first node by using a plurality of subcarrier spacings, the first subcarrier spacing is the same as one of the subcarrier spacings. For example, a minimum subcarrier spacing used for a data channel (a PDSCH and/or a PUSCH) is the same as the first subcarrier spacing.

In an example embodiment, the method further includes: The first node sends the information about the first subcarrier spacing to the parent node of the first node.

According to a second non-limiting aspect of an example embodiment, a data transmission method is provided. The method includes: A second node obtains information about a first backhaul resource. The second node sends reference information to a first node, where the reference information includes information about a first subcarrier spacing and the information about the first backhaul resource, and the reference information is used to determine a second backhaul resource used by the first node to transmit data. The second backhaul resource includes one or more sub-resources, each sub-resource includes M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource, so that the first node can transmit data on the second backhaul resource based on the reference information, to improve resource utilization.

Optionally, M is less than or equal to a ratio of the second subcarrier spacing to the first subcarrier spacing. Herein, a value of M is determined based on the second subcarrier spacing and the first subcarrier spacing.

In an example embodiment, the method further includes: The second node transmits data with the first node on the second backhaul resource.

Optionally, the reference information further includes an indication of a period of the first backhaul resource and an indication of a time domain position of the first backhaul resource, so that the first node can learn of the second backhaul resource more accurately based on the indication of the period of the first backhaul resource and the indication of the time domain position of the first backhaul resource.

According to a third non-limiting aspect of an example embodiment, a communications apparatus is provided. The communications apparatus includes modules configured to perform the method in any one of the first aspect or the embodiments of the first aspect, or modules configured to perform the method in any one of the second aspect or the embodiments of the second aspect.

According to a fourth non-limiting aspect of an example embodiment, a communications apparatus is provided. The communications apparatus may be the first node (for example, an IAB node or a terminal device) in the foregoing methods, or may be a chip disposed in the first node. The communications apparatus includes a processor that is coupled to a memory, and the processor may be configured to execute instructions in the memory, to implement the method performed by the first node in any one of the first aspect or the embodiments of the first aspect. Optionally, the communications apparatus further includes the memory. Optionally, the communications apparatus further includes a communications interface, and the processor is coupled to the communications interface.

When the communications apparatus is the first node, the communications interface may be a transceiver or an input/output interface.

When the communications apparatus is the chip disposed in the first node, the communications interface may be an input/output interface.

Optionally, the transceiver may be a transceiver circuit. Optionally, the input/output interface may be an input/output circuit.

According to a fifth non-limiting aspect of an example embodiment, a communications apparatus is provided. The communications apparatus may be the second node (for example, a network device) in the foregoing methods, or may be a chip disposed in the second node. The communications apparatus includes a processor that is coupled to a memory, and the processor may be configured to execute one or more instructions in the memory, to implement the method performed by the second node in any one of the second aspect or the embodiments of the second aspect. Optionally, the communications apparatus further includes the memory. Optionally, the communications apparatus further includes a communications interface, and the processor is coupled to the communications interface.

When the communications apparatus is the second node, the communications interface may be a transceiver or an input/output interface.

When the communications apparatus is the chip disposed in the second node, the communications interface may be an input/output interface.

Optionally, the transceiver may be a transceiver circuit. Optionally, the input/output interface may be an input/output circuit.

According to a sixth non-limiting aspect of an example embodiment, a program is provided. The program is executed by a processor to perform the method in any one of the first aspect, the second aspect, or the embodiments of the first aspect and the second aspect.

According to a seventh non-limiting aspect of an example embodiment, a program product is provided. The program product includes program code, and when the program code is run by a communications unit, a processing unit, a transceiver, or a processor of a communications apparatus (for example, a network device or a first node), the communications device is enabled to perform the method in any one of the first aspect, the second aspect, or the embodiments of the first aspect and the second aspect.

According to an eighth non-limiting aspect of an example embodiment, a computer-readable storage medium is provided. The computer-readable storage medium stores a program, and the program enables a communications apparatus (for example, a first node or a second node) to perform the method in any one of the first aspect, the second aspect, and the embodiments of the first aspect and the second aspect.

BRIEF DESCRIPTION OF DRAWINGS

FIG. 2 is a schematic diagram of a plurality of subcarrier spacing symbols;

FIG. 10 is a schematic diagram of backhaul resource configuration at different subcarrier spacings;

DESCRIPTION OF EMBODIMENTS

The following describes the technical solutions in embodiments of the present invention with reference to the accompanying drawings in the embodiments of the present invention. It is clear that, the described embodiments are merely some but not all of the embodiments of the present invention. All other embodiments obtained by a person skilled in the art based on the embodiments of the present invention without creative efforts shall fall within the protection scope of the present invention.

In the description of the embodiments of this application, unless otherwise stated, "a plurality of" or "multiple" means two or more than two. In addition, "at least one" may be replaced with "one or more".

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as a method or an equivalent replacement in this application, and is within the protection scope of this application.

In consideration of a high bandwidth of a future wireless network, it is considered to introduce an IAB solution into 5G new radio (NR), to further reduce deployment costs, improve deployment flexibility, and accordingly, introduce integrated access and backhaul relaying. In this application, a relay node that supports integrated access and backhaul is referred to as an IAB node, to distinguish a long term evolution (LTE) relay, and a system including the IAB node is also referred to as a relay system.

Figure 1:
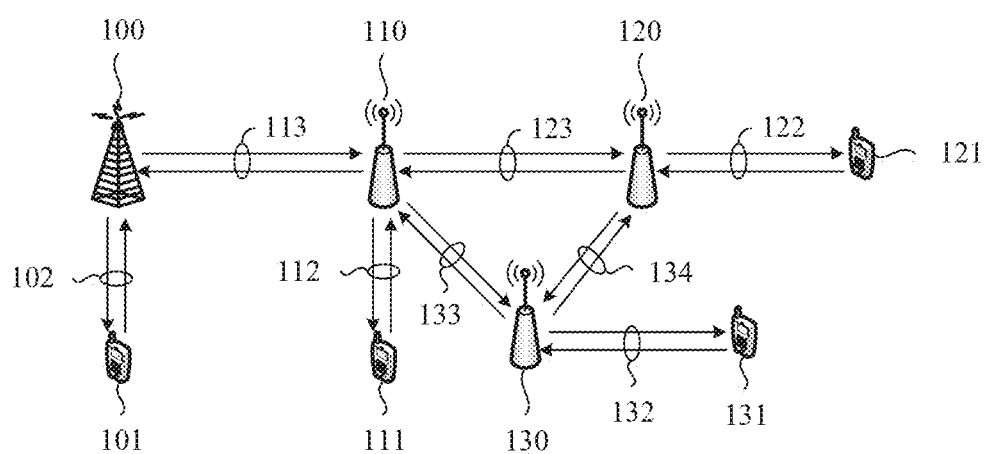
FIG. 1 is a schematic structural diagram of a communications system applicable to an embodiment of this application.

For a better understanding of a resource configuration method and an apparatus disclosed in the embodiments of the present invention, the following first describes a network architecture used in the embodiments of the present invention. FIG. 1 is a schematic structural diagram of a communications system applicable to an embodiment of this application.

It should be noted that the communications system mentioned in this embodiment of this application includes but is not limited to a narrowband internet of things (NB-IoT) system, a wireless local area network (WLAN) system, an LTE system, a next-generation 5G mobile communications system, or a communications system after 5G, for example, an NR system, or a device to device (D2D) communications system.

In the communications system shown in FIG. 1, an integrated access and backhaul (IAB) system is provided. One IAB system includes at least one base station 100, one or more terminal devices (terminal) 101 served by the base station 100 via a radio link 102, one or more relay nodes or IAB nodes 110, and one or more terminal devices 111 served by the IAB node 110 via a radio link 112. Usually, the base station 100 is referred to as a donor base station (donor next generation node B, DgNB). The IAB node 110 is connected to the base station 100 through a wireless backhaul link 113. In this application, the donor base station is also referred to as a donor node. The base station includes but is not limited to an evolved NodeB (eNB), a radio network controller (RNC), a NodeB (NB), a base station controller (BSC), and a base transceiver station (BTS), a home base station (for example, a home evolved NodeB, or home NodeB, HNB), a baseband unit (BBU), an evolved LTE (eLTE) base station, an NR base station (next generation node B, gNB), and the like. The terminal device 101 includes but is not limited to any one of user equipment UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a 5G network, a terminal device in a future evolved public land mobile network (PLMN) network, and the like. The IAB node is a specific name of the relay node, and does not constitute a limitation on the solutions of this application. The IAB node may be one of the foregoing base stations or terminal devices that have a forwarding function, or may be in a form of an independent device.

The integrated access and backhaul system may further include a plurality of other IAB nodes, for example, an IAB node 120 and an IAB node 130. The IAB node 120 is connected to the IAB node 110 through a wireless backhaul link 123, to access a network. The IAB node 130 is connected to the IAB node 110 through a wireless backhaul link 133, to access a network. The IAB node 120 serves one or more terminal devices 121 via a radio link 122. The IAB node 130 serves one or more terminal devices 131 via a radio link 132. In FIG. 1, both the IAB node 110 and the IAB node 120 are connected to a network through a wireless backhaul link. In this application, the wireless backhaul link is viewed from a perspective of the relay node. For example, the wireless backhaul link 113 is a backhaul link of the IAB node 110, and the wireless backhaul link 123 is a backhaul link of the IAB node 120. As shown in FIG. 1, one IAB node such as 120, may be connected to another IAB node 110 through a wireless backhaul link such as the wireless backhaul link 123, to connect to a network. In addition, the relay node may be connected to the network through a plurality of levels of wireless relay nodes. It should be understood that, in this application, an IAB node is used only for a purpose of description, and does not indicate that the solutions of this application are used only in an NR scenario. In this application, the IAB node may be any node or device that has a relay function. It should be understood that the IAB node and the relay node used in this application have a same meaning.

For ease of description, the following defines basic terms or concepts used in this application.

Parent node: A node that provides a wireless backhaul link resource. For example, 110 is referred to as a parent node of the IAB node 120.

Child node: A node that uses a backhaul link resource to transmit data to a network or receive data from a network is referred to as a child node. For example, 120 is referred to as a child node of the relay node 110. The network is a network in an upper layer over a core network or another access network, for example, the internet or a dedicated network.

Access link: An access link is a radio link used by a node to communicate with a child node of the node, and includes an uplink transmission link and a downlink transmission link. Uplink transmission on an access link is also referred to as uplink transmission of an access link, and downlink transmission on an access link is also referred to as downlink transmission of an access link. The node includes but is not limited to the foregoing IAB node.

Backhaul link: A backhaul link is a radio link used by a node to communicate with a parent node of the node, and includes an uplink transmission link and a downlink transmission link. Uplink transmission on a backhaul link is also referred to as uplink transmission of a backhaul link, and downlink transmission on a backhaul link is also referred to as downlink transmission of a backhaul link. The node includes but is not limited to the foregoing IAB node.

In another type of description, a link between the IAB node and a parent node is referred to as an upper-level backhaul link, a link between the IAB node and a child IAB node is referred to as a lower-level backhaul link, and a link between the IAB node and affiliated UE is referred to as an access link. However, in this application, for ease of description, a link between the IAB node and a parent node is referred to as a backhaul link, and a link between the IAB node and a child IAB node and/or a link between the IAB node and UE are collectively referred to as an access link.

Usually, a child node may be considered as a terminal device of a parent node. It should be understood that, in the integrated access and backhaul system shown in FIG. 1, one IAB node is connected to one parent node. However, in a future relay system, to improve reliability of a wireless backhaul link, one IAB node, for example, the IAB node 120, may have a plurality of parent nodes that all serve one IAB node. For example, the IAB node 130 in the figure may further be connected to the IAB node 120 through a backhaul link 134. In other words, both the IAB node 110 and the IAB node 120 are parent nodes of the IAB node 130. Names of the IAB nodes 110, 120, and 130 do not constitute a limitation on a scenario or a network in which the IAB nodes 110, 120, and 130 are deployed, and there may be any other name such as a relay or an RN. In this application, the IAB node is used only for ease of description.

In FIG. 1, radio links 102, 112, 122, 132, 113, 123, 133, and 134 may be bidirectional links, including uplink and downlink transmission links. Specifically, the wireless backhaul links 113, 123, 133, and 134 may be used by a parent node to provide a service for a child node. For example, the parent node 100 provides a wireless backhaul service for the child node 110. It should be understood that an uplink and a downlink of the backhaul link may be separated. To be specific, transmission on the uplink and transmission on the downlink are not performed through a same node. The downlink transmission refers to transmitting information or data from the parent node such as the node 100 to the child node such as the node 110. The uplink transmission refers to transmitting information or data from the child node such as the node 110 to the parent node such as the node 100. The node is not limited to a network node or a terminal device. For example, in a D2D scenario, a terminal device may be used as a relay node to serve another terminal device. In some scenarios, the wireless backhaul link may also be an access link. For example, the backhaul link 123 may also be considered as an access link for the node 110, and the backhaul link 113 is also an access link for the node 100. It should be understood that the parent node may be a base station or a relay node, and the child node may be a relay node or a terminal device having a relay function. For example, in the D2D scenario, the child node may also be a terminal device.

The relay node shown in FIG. 1, such as 110, 120, or 130, may exist in two forms. One form is that the relay node exists as an independent access node, and may independently manage a terminal device that accesses the relay node. In this case, the relay node usually has an independent physical cell identifier (PCI). A relay in this form usually needs to have all functions in a protocol stack, for example, radio resource control (RRC) functions. This relay is usually referred to as a layer 3 relay. A relay node and a donor node, such as a donor eNB or a donor gNB, that are in the other form belong to a same cell, and a user is managed by a donor base station, for example, the donor node. Such a relay is usually referred to as a layer 2 relay. The layer 2 relay usually exists as a DU of a base station DgNB in an NR control and bearer separation (central unit and Distributed unit, CU-DU) architecture, and communicates with a CU by using an F1-AP (F1 application protocol) interface or a tunneling protocol. The tunneling protocol may be, for example, a general packet radio service tunneling protocol (GTP). The donor node is a node through which a core network may be accessed, or an anchor base station in a radio access network. A network may be accessed through the anchor base station. The anchor base station is responsible for receiving data of the core network and forwarding the data to the relay node, or receiving data of the relay node and forwarding the data to the core network. A donor node in a relay system is usually referred to as an IAB donor. In this application, the two terms may be alternately used. It should not be understood that the IAB donor and the donor node are entities or network elements having different functions.

In this embodiment of this application, the relay node (for example, the IAB node), the terminal device, or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute a program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry one or more instructions and/or data.

For ease of understanding, some terms or concepts in the embodiments of this application are explained below.

Multiple Numerology in NR

In NR, waveform-related parameters such as a subcarrier spacing and a CP length are referred to as numerologies. The embodiments of this application mainly relate to the subcarrier spacing.

The subcarrier spacing in NR is $2^\mu \cdot 15$ kHz. Table 1 shows a relationship between a value of $\mu$ and the subcarrier spacing.

TABLE 1

| μ | Subcarrier spacing (kHz) |
|---|---|
| 0 | 15 |
| 1 | 30 |
| 2 | 60 |
| 3 | 120 |
| 4 | 240 |

Generally, different subcarrier spacings (SCS) have different applicable frequency bands. For example, in a common CP, subcarrier spacings used for a low-frequency (lower than 6 GHz) data and control channels (including a PDCCH, a PDSCH, a PUCCH, a PUSCH, and the like) are 15 kHz and 30 kHz; and subcarrier spacings used for a high-frequency data channel are 60 kHz and 120 kHz. In addition, when an extended CP is used, the low-frequency data channel may further use a subcarrier spacing of 60 kHz.

Figure 2:
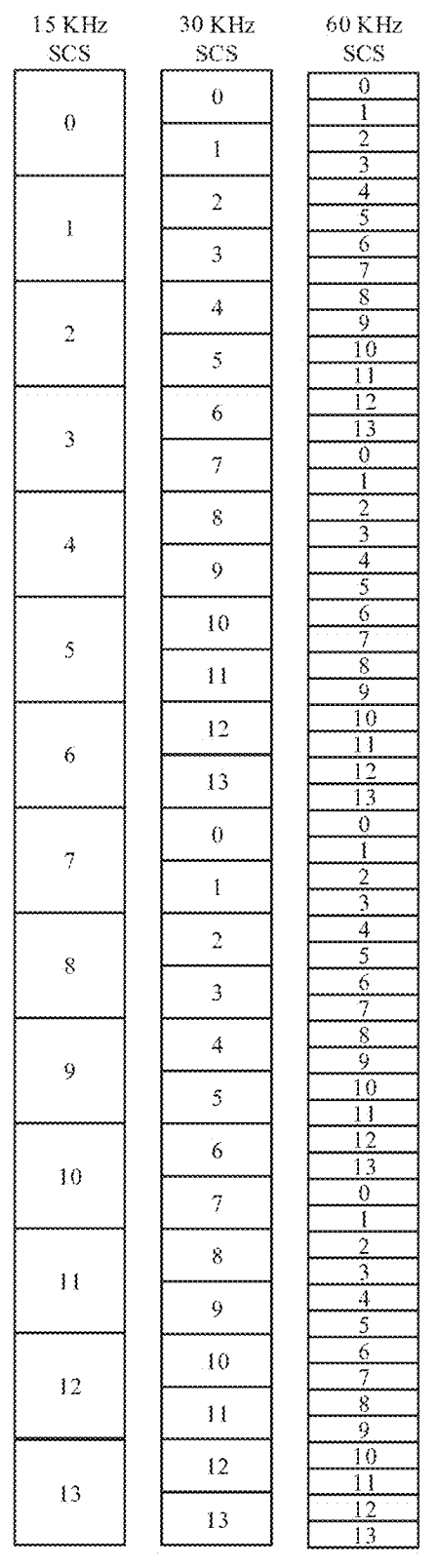

A case of the common CP is mainly considered in this application. FIG. 2 is a schematic diagram of symbols for a plurality of types of subcarrier spacings. In FIG. 2, a time length of 1 ms corresponds to one slot of a 15 kHz SCS, that is, 14 symbols, and also corresponds to two slots of a 30 kHz SCS and four slots of a 60 kHz SCS. Similarly, a time length of 1 ms may also correspond to eight slots of a 120 kHz SCS (not shown in FIG. 2). It can be learned from the foregoing content that lengths of slots and lengths of symbols are both different at different subcarrier spacings. Therefore, in some cases, when a slot is provided, a subcarrier spacing corresponding to the slot also needs to be provided.

TDD Slot Format Configuration

In LTE, frame structure (a downlink subframe, an uplink subframe, or a special subframe) configuration in a TDD system is performed by using RRC signaling, and the configuration has seven fixed formats. In NR, for implementing a more flexible time division duplex operation and adapting to a feature of having a plurality of SCSs, TDD frame structure configuration, also referred to as slot format configuration, is more flexible.

The network device may configure a slot format for UE in one or more of the following manners.

Figure 3:
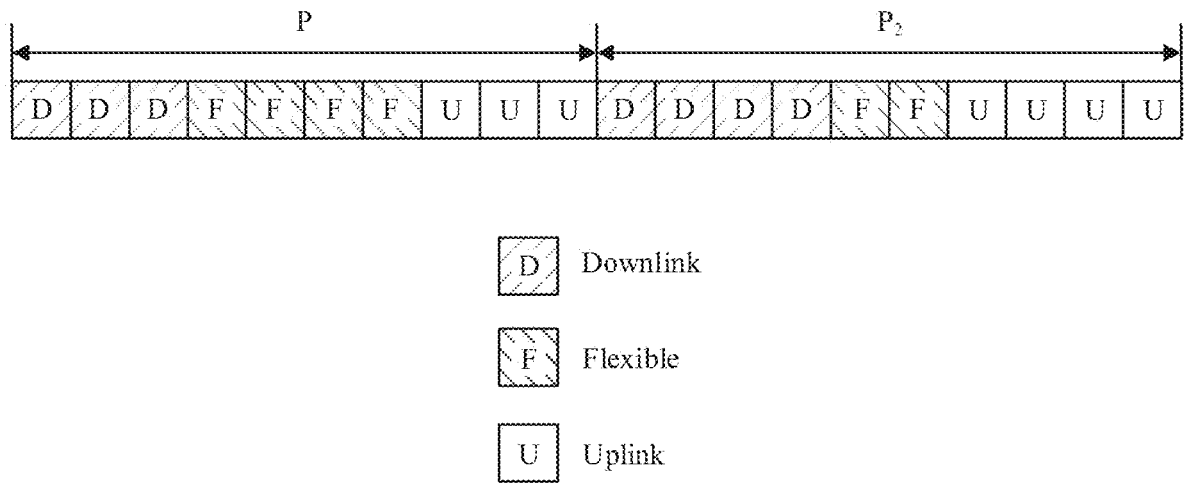
FIG. 3 is a schematic diagram of a period of TDD slot structure configuration.

1. Broadcast message: A broadcast message provides cell-specific uplink and downlink configuration, for configuring a transmission direction of slots and symbols in a period. In one period, starting from a downlink slot, several start symbols in a slot that is after the last downlink slot may be downlink symbols; and ending at an uplink slot, several end symbols in a slot that is before the first uplink slot may be uplink symbols. A slot and a symbol other than the slots and the symbols are a flexible slot and a flexible symbol. The flexible slot and the flexible symbol are a slot and a symbol of which transmission directions are not determined. In the uplink and downlink configuration in the broadcast message, the foregoing period can be configured. In addition, the uplink and downlink configuration may alternatively be dual-period configuration. A configuration manner of each period is described above, and an obtained final slot pattern is shown in FIG. 3.

A more detailed explanation is provided by using the dual-period configuration as an example. As shown in FIG. 3, duration of a period 1 is $P_1$ and duration of a period 2 is $P_2$. In the protocol, a unit of the period is millisecond (ms). Each period includes an uplink slot (corresponding to a resource indicated by U in FIG. 3), a downlink slot (corresponding to a resource indicated by D in FIG. 3), and a flexible slot (corresponding to a resource indicated by F in FIG. 3). In addition to the period, the slot configuration in the broadcast message further includes a reference subcarrier spacing. Both the slot and the symbol in the foregoing configuration use the reference subcarrier spacing as a reference. Reference subcarrier spacings in the two periods are the same, and the reference subcarrier spacings are less than or equal to a subcarrier spacing of a BWP configured for the UE. It should be noted that the uplink and downlink configuration pattern shown in FIG. 3 is periodically repeated. It should be understood that the TDD format in FIG. 3 is merely used as an example for description herein, and the TDD constitutes no limitation to embodiments of the present disclosure.

2. RRC unicast message: The network device may configure an uplink direction and a downlink direction of a slot and a symbol for the UE by using unicast RRC signaling. In the configuration, the network device indicates both a serial number of a configured slot and an uplink and downlink configuration of a symbol in the configured slot. It should be noted that, in an existing protocol, the RRC signaling can be used to configure only a flexible slot or symbol in broadcast signaling.

3. DCI message: The network device may indicate the slot format to the UE by using DCI format 2_0. In a flexible slot or symbol configured by using DCI, the UE does not receive or send a semi-persistent signal configured on a higher layer (for example, a periodic CSI-RS or SRS).

Because there are a plurality of types of subcarrier spacings in NR, this embodiment of this application provides a solution to how to improve resource utilization in a scenario of a plurality of types of subcarrier spacings. The following describes the solution in detail.

Figure 4:
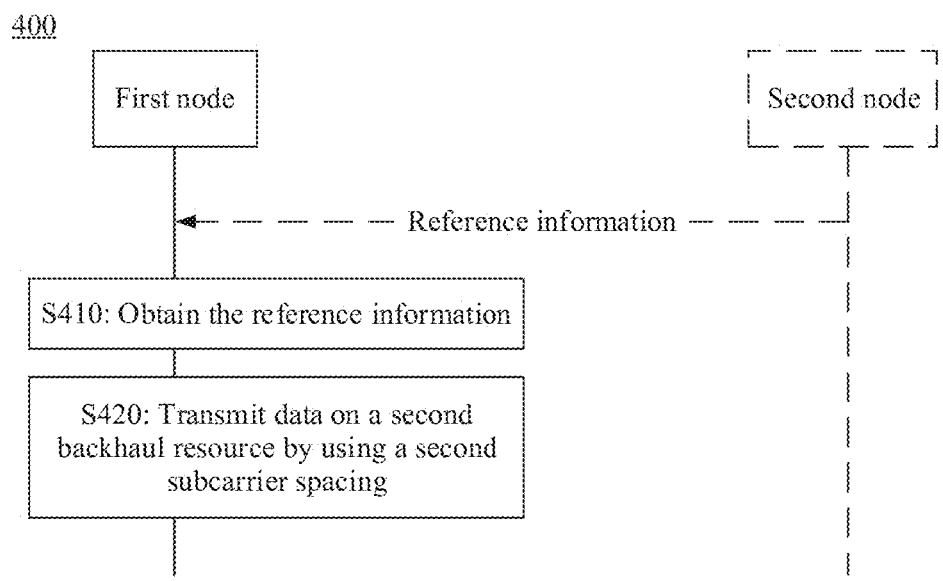
FIG. 4 is a schematic flowchart of a data transmission method according to an embodiment of this application.

FIG. 4 is a schematic interaction diagram of a data transmission method 400 according to an embodiment of this application. As shown in FIG. 4, the method 400 includes the following steps:

S410: A first node obtains reference information, where the reference information includes information about a first subcarrier spacing and information about a first backhaul resource.

The first subcarrier spacing may be understood as a reference subcarrier spacing. The first backhaul resource is configured based on the first subcarrier spacing. In other words, a subcarrier spacing used for configuring the first backhaul resource is the first subcarrier spacing. For example, the first backhaul resource configured for the first node is one or more slots, and the slot uses the first subcarrier spacing as a reference.

The first node may be a relay node, for example, an IAB node.

Optionally, the first subcarrier spacing may be the same as a reference subcarrier spacing used for TDD uplink and downlink configuration.

Optionally, the information about the first subcarrier spacing may be carried in TDD uplink and downlink configuration signaling. The TDD uplink and downlink configuration signaling is signaling used to send the TDD uplink and downlink configuration. A unified description is provided herein. Herein, "the information about the first subcarrier spacing may be carried in TDD uplink and downlink configuration signaling" may have a plurality of explanations: The first subcarrier spacing may be directly carried in the TDD uplink and downlink configuration signaling, and is, for example, 60 kHz. Alternatively, information used to indirectly indicate the first subcarrier spacing may be carried in the TDD uplink and downlink configuration signaling. For example, the value of μ (refer to the foregoing Table 1) is carried in the TDD uplink and downlink configuration signaling. For example, when the value of μ is 2, it indicates that the first subcarrier spacing is 60 kHz. This is not specifically limited in embodiments of the present disclosure. In other words, the information about the first subcarrier spacing may be relatively flexible, provided that the information can indicate the first subcarrier spacing. Specific content is not specifically limited in embodiments of the present disclosure.

The signaling corresponding to the TDD uplink and downlink configuration is TDD-UL-DL-ConfigCommon, and the reference subcarrier spacing is carried in an information element referenceSubcarrierSpacing. When the first subcarrier spacing is the same as the reference subcarrier spacing used for the TDD uplink and downlink configuration, resource configuration and coordination of the first node and/or a parent node can be simplified.

Optionally, the TDD uplink and downlink configuration signaling may be sent by the first node to a child node.

It should be understood that the information about the first subcarrier spacing may be carried in existing signaling, or may be carried in new signaling. This is not limited in embodiments of this application.

It should be further understood that the information about the first subcarrier spacing may be carried both in the reference information and the TDD uplink and downlink configuration signaling, may be carried only in the reference information, or may be carried only in the TDD uplink and downlink configuration signaling. This is not limited in embodiments of the present disclosure.

Optionally, the reference information may also be predefined in a protocol. Alternatively, optionally, S410 includes: The first node receives the reference information from a second node. Correspondingly, the second node sends the reference information to the first node. In other words, the reference information may be sent by the second node to the first node by using signaling.

Optionally, the TDD uplink and downlink configuration signaling may alternatively be sent by the second node.

Optionally, the second node is a parent node of the first node. Optionally, the parent node may be an IAB node or a network device (for example, a donor base station). This is not limited in embodiments of the present disclosure.

Optionally, a subcarrier spacing used for communication between the first node and a child node of the first node is greater than or equal to the first subcarrier spacing. Optionally, when the first node communicates with the child node of the first node by using a plurality of subcarrier spacings, the first subcarrier spacing is the same as one of the subcarrier spacings. For example, a minimum subcarrier spacing used for a data channel (for example, a physical downlink shared channel (PDSCH) and/or a physical uplink shared channel (PUSCH)) is the same as the first subcarrier spacing. Optionally, the first node may report, to the parent node, the subcarrier spacing used for communication between the first node and the child node.

It should be noted that, in an example embodiment, when the first node obtains the first subcarrier spacing, the first node has not established a connection to the child node of the first node, that is, there is no subcarrier spacing used for communication between the first node and the child node of the first node. In this case, the first node or the second node may determine in advance a subcarrier spacing for communication between the first node and the child node of the first node.

For example, the reference information may further include an indication of a period of the first backhaul resource and an indication of a time domain position of the first backhaul resource. The period of the first backhaul resource may be independently configured, or may be associated with a period used in the TDD uplink and downlink configuration. For example, if the TDD uplink and downlink configuration uses a single period, and a period length is P, the period of the first backhaul resource may be N×P, where N is an integer greater than or equal to 1. For another example, if the TDD uplink and downlink configuration uses two periods, and period lengths are P and $P_2$ respectively, the period of the first backhaul resource may be N×(P+$P_2$), where N is an integer greater than or equal to 1. In this example, if P=$P_2$, the period of the first backhaul resource may be N×2P. It should be understood that the period of the TDD uplink and downlink configuration herein may be sent by the second node to the first node, or may be sent by the first node to the child node of the first node. This is not limited in embodiments of the present disclosure. A value of N may be specified in a protocol, or may be notified by a parent node to the first node. This is not specifically limited.

The indication of the time domain position of the first backhaul resource may be a slot number and/or a symbol number, and the number may also be understood as an index number. It should be understood that, after obtaining the indication of the time domain position of the first backhaul resource, the first node may further need to receive downlink control information (DCI) or sidelink control information (SCI), to determine whether a backhaul resource indicated by the indication of the time domain position of the first backhaul resource is actually scheduled. Because the configured first backhaul resource may not be scheduled, the first backhaul resource may be considered as an optional backhaul resource, that is, a backhaul resource that may be actually scheduled during backhaul transmission.

S420: The first node transmits data on a second backhaul resource by using a second subcarrier spacing, where the second backhaul resource includes one or more sub-resources, each sub-resource includes M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource.

Herein, "the first node transmits data on a second backhaul resource by using a second subcarrier spacing" may be explained as follows: A subcarrier spacing used by the first node to send and/or receive, on the second backhaul resource, a data channel is the second subcarrier spacing. In other words, the method in this embodiment of this application is not only applicable to downlink, but also applicable to uplink. This is not limited in embodiments of the present disclosure.

Herein, the first node transmits data with the parent node of the first node. For example, the first node transmits data with the second node.

The sub-resource included in the second backhaul resource may be a combination of the M resource units. For example, each sub-resource includes a plurality of consecutive slots. Optionally, in this application, one of the M resource units represents one slot or symbol based on the second subcarrier spacing.

The second subcarrier spacing is a subcarrier spacing actually used by the second node during backhaul transmission. In an example embodiment, the second subcarrier spacing is greater than or equal to the first subcarrier spacing. For example, the first subcarrier spacing is 60 kHz, and a subcarrier spacing of a BWP used for actual backhaul transmission may be 120 kHz.

Optionally, M is a ratio of the second subcarrier spacing to the first subcarrier spacing. Alternatively, optionally, M is an integer less than a ratio of the second subcarrier spacing to the first subcarrier spacing. Alternatively, optionally, M may be a value predefined in a protocol or configured by the second node, but needs to satisfy the following condition: M is greater than or equal to 1 and less than or equal to a ratio of the second subcarrier spacing to the first subcarrier spacing.

Optionally, for time domain, a time domain resource corresponding to the second backhaul resource may be a subset of a time domain resource corresponding to the first backhaul resource. That a time domain resource corresponding to the second backhaul resource is a subset of a time domain resource corresponding to the first backhaul resource means that the time domain resource corresponding to the second backhaul resource may be included in the time domain resource corresponding to the first backhaul resource, or is less than or equal to the time domain resource corresponding to the first backhaul resource.

Figure 5:
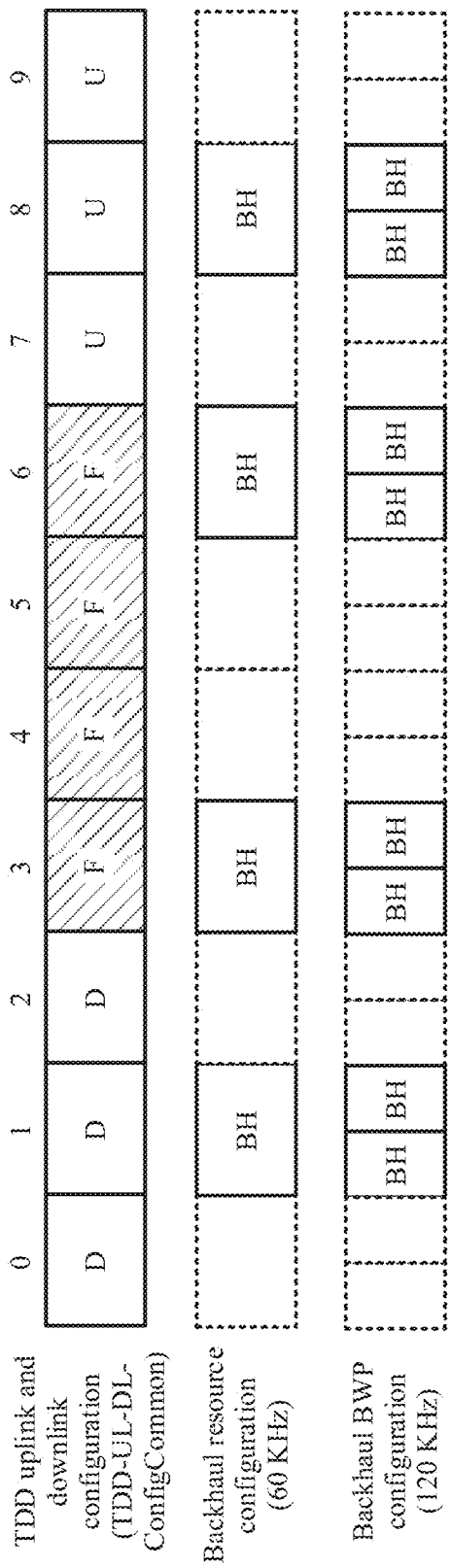
FIG. 5 is a schematic diagram of an example of a backhaul resource according to an embodiment of this application.

The following describes a schematic diagram of a backhaul resource with reference to an example in FIG. 5. The $1^{st}$ row in FIG. 5 is TDD uplink and downlink resource configuration, and the TDD uplink and downlink resource configuration includes 10 slots. The $2^{nd}$ row is backhaul resource configuration (a backhaul resource indicated in the $2^{nd}$ row may correspond to the first backhaul resource) based on 60 kHz (a reference subcarrier spacing or the first subcarrier spacing). Backhaul resources (BHs) (that is, a solid line part) based on 60 kHz correspond to a slot 1, a slot 3, a slot 6, and a slot 8 in the TDD uplink and downlink resource configuration in the first row. The $3^{rd}$ row is backhaul resource configuration (the $3^{rd}$ row may correspond to the foregoing second backhaul resource) based on 120 kHz (an actually used subcarrier spacing or the second subcarrier spacing). For a backhaul resource (BH) based on 120 kHz, refer to the backhaul resource (BH) that is based on 60 kHz. Herein, M=2. It can be learned from FIG. 5 that in the backhaul resource configuration based on 120 kHz, every two slots form one sub-resource, that is, one resource unit is one slot. It can be learned from FIG. 5 that, for example, the first backhaul resource is the backhaul resource configuration that is based on 60 kHz, and BH resources in one period include the resources corresponding to the slot 1, the slot 3, the slot 6, and the slot 8. In other words, FIG. 5 shows BH resources in one of periods that are based on 60 kHz, and resources corresponding to the slot 1, the slot 3, the slot 6, and the slot 8 in a next period are first backhaul resources in the next period.

It should be noted that, in FIG. 5, it is assumed that the first subcarrier spacing is the same as the reference subcarrier spacing of the TDD uplink and downlink resource configuration. However, this application is not limited to this assumption. In other words, the first subcarrier spacing may alternatively be different from the reference subcarrier spacing of the TDD uplink and downlink resource configuration. This is not limited in embodiments of the present disclosure.

Optionally, each of the M resource units may include a plurality of available symbols.

The following provides a configuration and scheduling process of the second backhaul resource. Optionally, a parent node may indicate, to the first node by using a configuration such as a BWP, a subcarrier spacing used for actual data transmission. For example, the parent node configures an uplink BWP or a downlink BWP for the first node. The uplink BWP may indicate that a subcarrier spacing used for a PUSCH is the second subcarrier spacing, or the downlink BWP may indicate that a subcarrier spacing used for a PDSCH is the second subcarrier spacing. Optionally, when the parent node indicates the first node to perform transmission on some resources, for example, in one slot that is based on the first subcarrier spacing, by using the foregoing BWP, the resource may be referred to as the second backhaul resource.

At the second backhaul resource, the first node uses the sub-resource including the M resource units to perform communication. Herein, there are a plurality of implementations for a combination of the M resource units. An example in which a resource unit is a slot that is based on the second subcarrier spacing is used below for description. In an example embodiment, M slots are aggregated into one aggregated slot (or it may be understood that M slots are combined into one slot group), and the parent node schedules the aggregated slot by using a single piece of DCI. In another embodiment, the M slots are aggregated into one aggregated slot, but the parent node uses independent DCI to schedule each component slot. Optionally, the first node does not perform switching between component slots. For example, for a downlink, the first node continuously receives the last symbol of a component slot m and the first symbol of a component slot m+1, where a value range of m is 0 to M−1, and the value range includes an endpoint value.

Figure 6:
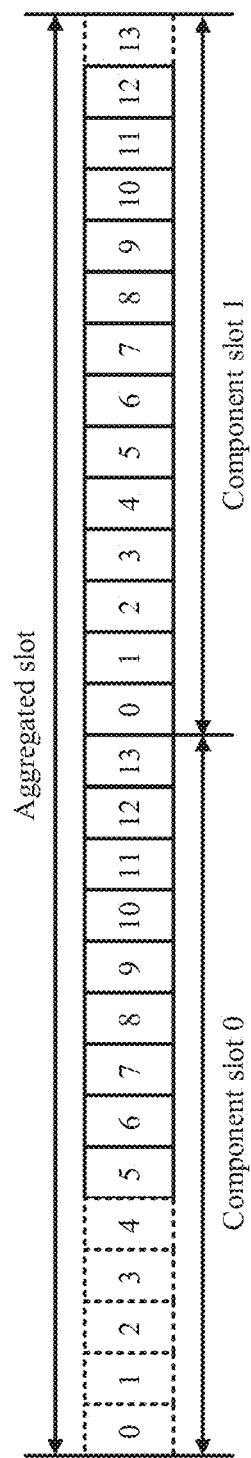
FIG. 6 is a schematic diagram of an example of an aggregated slot according to an embodiment of this application.

An example in which M=2 is used for description. As shown in FIG. 6, one aggregated slot may include two component slots: a component slot 0 and a component slot 1, where each component slot includes 14 symbols.

In this embodiment of this application, "aggregated slot" and "slot group" may be interchangeable. In other words, "M slots are aggregated into one aggregated slot" may be equivalent to "M slots are combined into one slot group". A unified description is provided herein.

In this embodiment of this application, the aggregated slot may have the following explanations: (1) a sub-resource including M slots that are based on the second subcarrier spacing, where the sub-resource is scheduled by using the single piece of DCI. (2) a sub-resource including M slots that are based on the second subcarrier spacing, where each component slot is scheduled by using the independent DCI. A specific aggregation method may be specified in a protocol, or may be configured by the parent node. This is not limited in embodiments of the present disclosure.

Figure 7A:
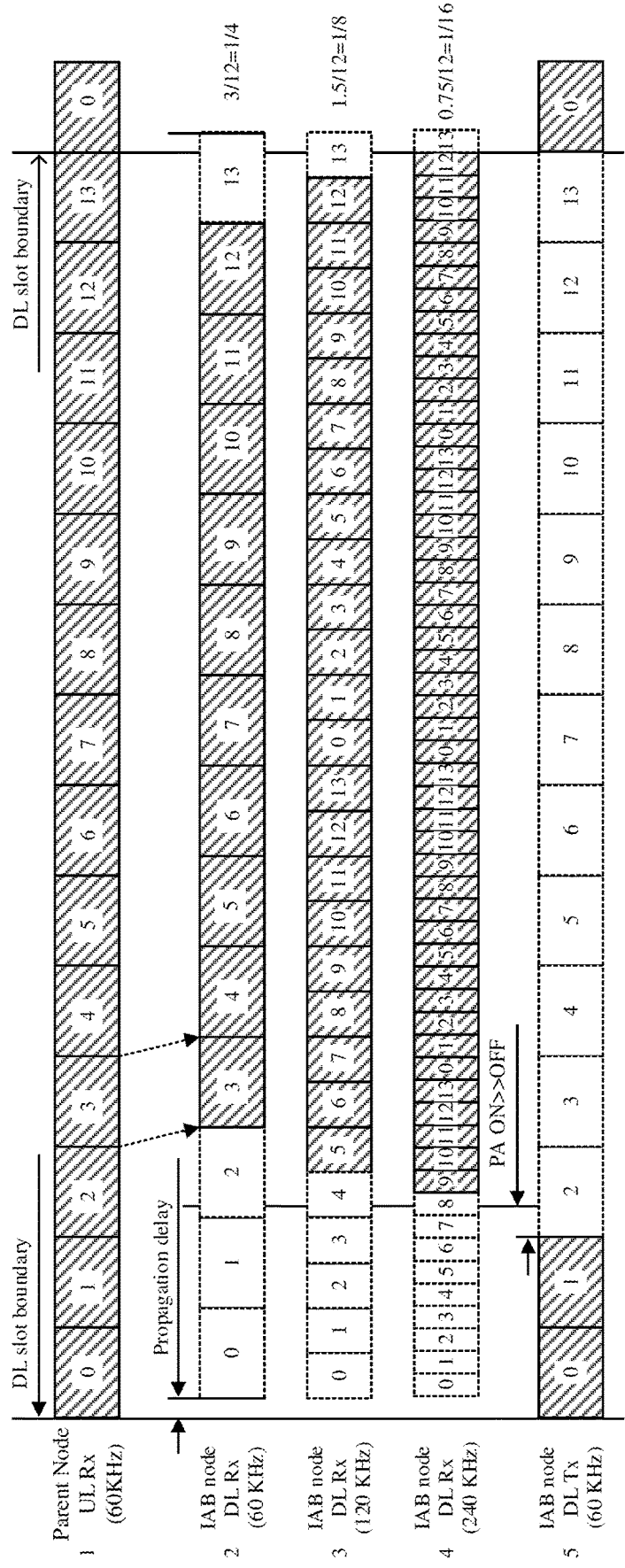
FIG. 7A and FIG. 7B are a schematic diagram of slot structures of different subcarrier spacings applied to an embodiment of this application.
Figure 7B:
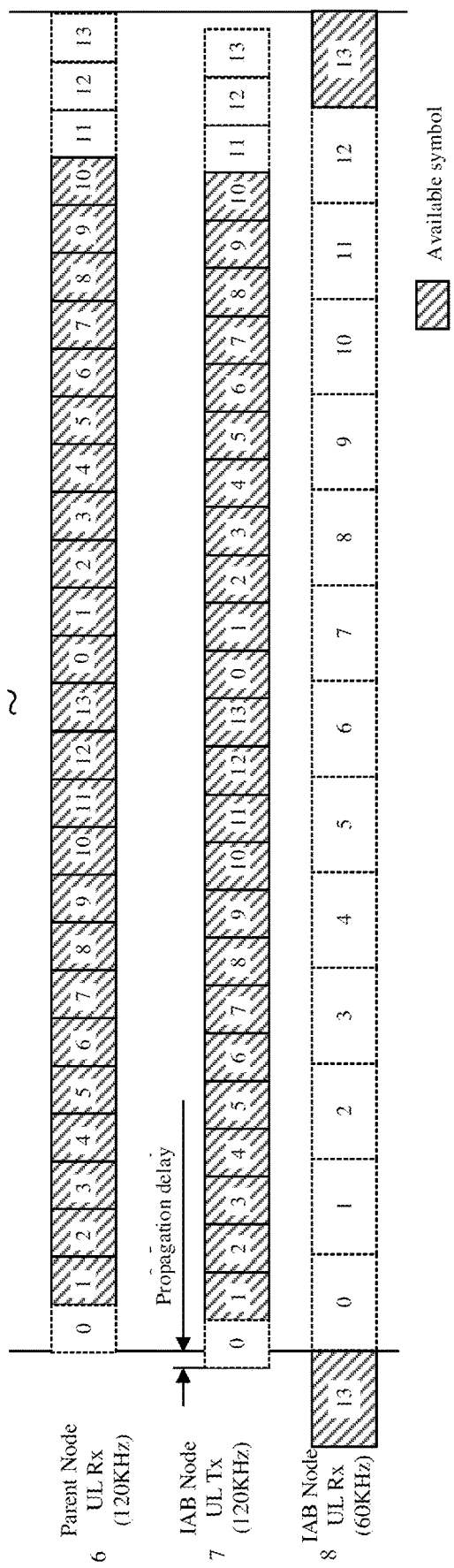

In a frequency band below 6 GHz, a subcarrier spacing used for a data channel is 15 kHz or 30 kHz, and in a frequency band above 6 GHz, a subcarrier spacing used for the data channel is 60 kHz or 120 kHz. A larger subcarrier spacing can increase spectral efficiency of a backhaul resource, and a channel condition of the backhaul link is generally relatively good, so that a larger subcarrier spacing can be supported. Therefore, it may be considered to use a larger subcarrier spacing for an IAB node. For example, a data channel subcarrier spacing of 60 kHz is used in a frequency band below 6 GHz, or a data channel subcarrier spacing of 240 kHz is used in a frequency band above 6 GHz. A larger subcarrier spacing can increase spectral efficiency of a backhaul resource, and a channel condition of the backhaul link is generally relatively good, so that a larger subcarrier spacing can be supported. An example in FIG. 7A and FIG. 7B shows slot structures of different subcarrier spacings. A unified description is provided herein. In FIG. 7A and FIG. 7B, DL Tx represents downlink transmission, DL Rx represents downlink reception, UL Tx represents uplink transmission, and UL Rx represents uplink reception.

With reference to FIG. 7A and FIG. 7B, a slot based on a 60 kHz subcarrier spacing is used as an example for description. To be specific, it is assumed that the first subcarrier spacing is 60 kHz, and the slot may also be referred to as a slot that is based on the first subcarrier spacing. As shown in FIG. 7A and FIG. 7B, the 1st row represents sending resources (where an example in which a subcarrier spacing is 60 kHz and one slot includes 14 symbols is used) of a parent node. The $2^{nd}$ row to the $4^{th}$ row all represent corresponding resources for reception through a backhaul link of an IAB node. In the $2^{nd}$ row, an example in which a subcarrier spacing is 60 kHz (that is, the second subcarrier spacing is 60 kHz) and one sub-resource includes one slot is used. In the $3^{rd}$ row, an example in which a subcarrier spacing is 120 kHz (that is, the second subcarrier spacing is 120 kHz) and one sub-resource includes two slots is used. In the $4^{th}$ row, an example in which a subcarrier spacing is 240 kHz (that is, the second subcarrier spacing is 240 kHz) and one sub-resource includes four slots is used.

The $5^{th}$ row represents corresponding resources (an example in which a subcarrier spacing is 60 kHz and one slot includes 14 symbols is used) for sending through an access link and/or a lower-level backhaul link of the IAB node. It should be noted that, it is assumed herein that a subcarrier spacing used for the access link and/or the lower-level backhaul link of the IAB node is the same as the first subcarrier spacing. However, this application is not limited to this assumption. In other words, the access link and/or the lower-level backhaul link of the IAB node may be different from the first subcarrier spacing. This is not limited in embodiments of this application.

Optionally, for a downlink, the first node may send a PDCCH of the access link at a start position of a slot. For example, as shown in FIG. 7A and FIG. 7B, for a resource (resource configuration in the $2^{nd}$ row) for a subcarrier spacing of 60 kHz of the access link, the IAB node sends the PDCCH by using the first two symbols of the slot. It should be understood that during specific implementation, the first node may not send a PDCCH at a slot head, or even if a PDCCH is sent, a quantity of symbols occupied by the PDCCH may not be equal to 2. Because of a transmit/receive conflict, the first node cannot perform backhaul link reception at time domain positions occupied by the two symbols. For example, when a subcarrier spacing (the second subcarrier spacing) of the backhaul link is 60 kHz, a time domain resource occupied by the PDCCH on the backhaul link also includes two symbols. When the second subcarrier spacing is 120 kHz, a time domain resource occupied by the PDCCH on the backhaul link includes four symbols. When the second subcarrier spacing is 240 kHz, a time domain resource occupied by the PDCCH on the backhaul link includes eight symbols. Therefore, for different second subcarrier spacings, start symbol positions of the backhaul link in one slot based on the first subcarrier spacing may be different from each other.

In addition, because there may be switching from sending to receiving, the first node may further need at least one symbol that is based on the second subcarrier spacing and that is used as a guard interval for switching.

In an example embodiment, a parent node may learn of a quantity of symbols used by the first node for sending a PDCCH at heads of all or some slots. The quantity of symbols for sending the PDCCH is denoted as K (specially, a case in which the quantity of symbols for sending the PDCCH is 0, that is, K=0, corresponds to a case in which there is no PDCCH symbol at a slot head). A corresponding subcarrier spacing for sending a PDCCH is referred to as a third subcarrier spacing, and is denoted as $2^{\mu_3} \cdot 15$ kHz. In addition, the second subcarrier spacing is denoted as $2^{\mu_2} \cdot 15$ kHz herein. When K is not equal to 0, an index corresponding to a start symbol of the backhaul link should be greater than or equal to $$\left\lceil K \frac{2^{\mu_2}}{2^{\mu_3}} \right\rceil + k_0.$$

The symbol "⌈ ⌉" represents rounding up, and $k_0$ represents a quantity of symbols used for the switching. In FIG. 7A and FIG. 7B, it is assumed that $k_0$ is equal to 1.

Downlink resource configuration shown in the $2^{nd}$ row in FIG. 7A and FIG. 7B is used for description. A subcarrier spacing of an access link (corresponding to the configuration shown in the $2^{nd}$ row) sent by an IAB node is the same as a subcarrier spacing of an upper-level backhaul resource (corresponding to configuration shown in the first row) received by the IAB node. The first two symbols (specifically, a symbol 0 and a symbol 1) of the backhaul resource cannot be used because the first two symbols conflict with a sending symbol of the access link. A symbol 2 needs to be used for the switching from sending to receiving, and a symbol 13 needs to be used for switching from receiving to sending. As a result, neither the symbol 2 nor the symbol 13 can be used. In addition, overheads are caused by a symbol used to send a DMRS. As a result, in this slot, in addition to the two symbols occupied by the access link, a remaining resource is 12 symbols, and the overheads and the DMRS may occupy three symbols in total (if a quantity of symbols occupied by the DMRS is 1). As a result, about ¼ of resources are unavailable or wasted. It should be understood that the overheads herein are a value obtained based on a specific assumption, and actual overheads may be different. For example, the quantity of symbols occupied by the DMRS may not be 1. In other words, a quantity of symbols occupied by the overheads is not specifically limited in this embodiment, and may be determined based on an actual case. In other words, for the backhaul resource shown in the $2^{nd}$ row, available symbols are the symbol 3 to a symbol 12.

For resource configuration shown in the $3^{rd}$ row and resource configuration shown in the $4^{th}$ row, available symbols are shown in a shaded part in FIG. 7A and FIG. 7B. Similarly, for the resource configuration (that is, a subcarrier spacing is 120 kHz) shown in the $3^{rd}$ row, switching from sending to receiving, switching from receiving to sending, and DMRS switching of the IAB node each occupy one symbol. Because a symbol length is shorter in this case, the overheads are reduced by half to ⅛ (that is, about ⅛ of the resources are unavailable or wasted). Similarly, for the resource configuration (that is, a subcarrier spacing is 240 kHz) shown in the $4^{th}$ row, the overheads are reduced to 1/16 (that is, about 1/16 of the resources are unavailable or wasted). Therefore, it can be learned from FIG. 7A and FIG. 7B that, because of switching overheads unique to the IAB node, in some cases, increasing a subcarrier spacing can reduce unavailable or wasted resources, so that resource utilization is improved.

For an uplink, the first node may receive an uplink signal such as a PUCCH of a child node or UE at a tail of a slot. In this case, an uplink backhaul link of the first node should also avoid a time domain position occupied by the PUCCH and a spacing for switching from sending to receiving. A lower part of the diagram in FIG. 7A and FIG. 7B shows a backhaul slot structure of an uplink. As shown in the lower part of the diagram in FIG. 7A and FIG. 7B, an IAB node receives an uplink signal such as a PUCCH of a child node or UE in the last symbol of a slot that is based on a 60 kHz subcarrier spacing. As a result, if the IAB node uses a symbol with a 120 kHz subcarrier spacing to perform sending, the IAB node cannot perform uplink backhaul sending in the last two symbols in the second component slot that is based on the 120 kHz subcarrier spacing, because the two symbols overlap the symbol used by the IAB node to receive an uplink signal such as a PUCCH. In addition, the IAB node cannot perform uplink backhaul sending in an antepenultimate symbol in the second component slot that is based on the 120 kHz subcarrier spacing, because this symbol needs to be used for the switching from sending to receiving of the IAB node.

For an uplink, in an example embodiment, optionally, the second node may learn of a quantity of symbols and a subcarrier spacing that are used by the first node to receive an uplink signal such as a PUCCH in all or some slots.

In this embodiment of this application, in the backhaul resource, there is a time resource (for example, a symbol) used to send a DMRS signal. The following provides detailed description.

Optionally, the sub-resource includes one or more time resources used for transmitting a demodulation reference signal (DMRS), and the method further includes:

The first node sends the DMRS on the one or more time domain positions used for transmitting the DMRS.

One sub-resource may include at least one time resource used for transmitting the DMRS, or it may be understood that there is at least one time resource used for transmitting the DMRS in total in the M resource units.

In other words, the sub-resource includes one or more symbols used for transmitting the DMRS, and the first node may send the DMRS on these symbols.

A start position that is of the one or more time resources used for transmitting the DMRS and that is in the sub-resource may be located in the first available symbol of the sub-resource (that is, the first available symbol in the first resource unit in the M resource units), or may not be the first available symbol of the sub-resource (for example, may be an available symbol in any one of the other resource units than the first resource unit in the M resource units). This is not specifically limited.

Optionally, the one or more time resources used for transmitting the DMRS start from the $1^{st}$ available symbol of the sub-resource, and the available symbol is a symbol that can be used for transmitting data or a signal.

For ease of understanding, the following example is used for description.

Figures 8A, 8B:
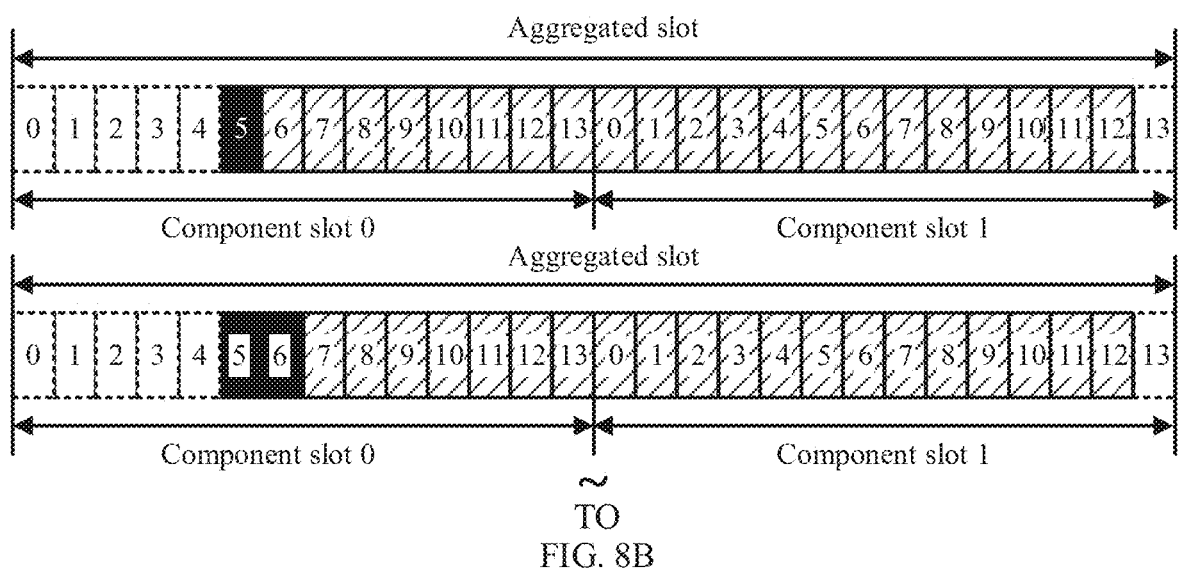
FIG. 8A to FIG. 8C are a schematic diagram of locations of symbols that are used to send a DMRS and that are each in a slot according to an embodiment of this application.
Figure 8B:
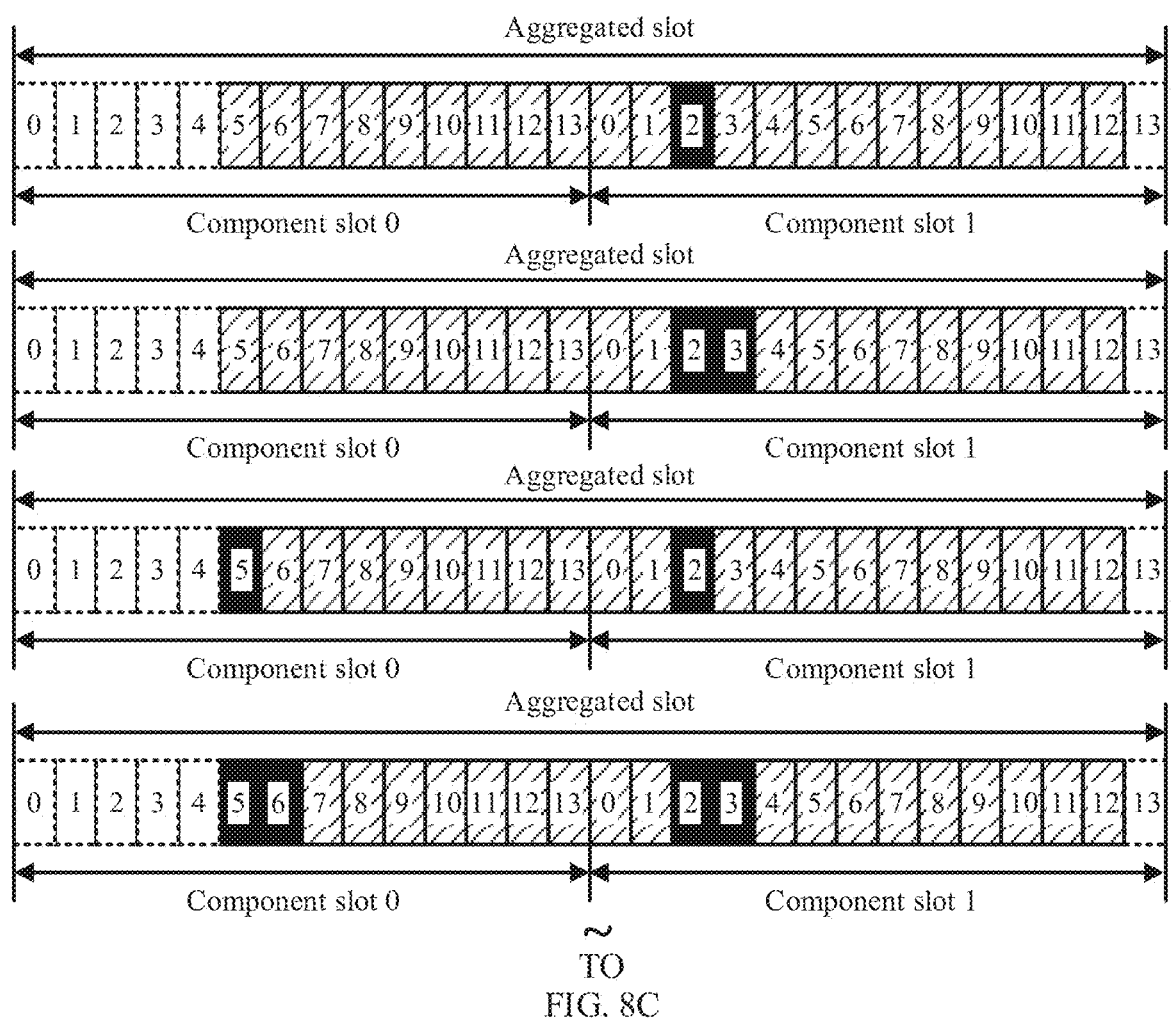
Figure 8C:
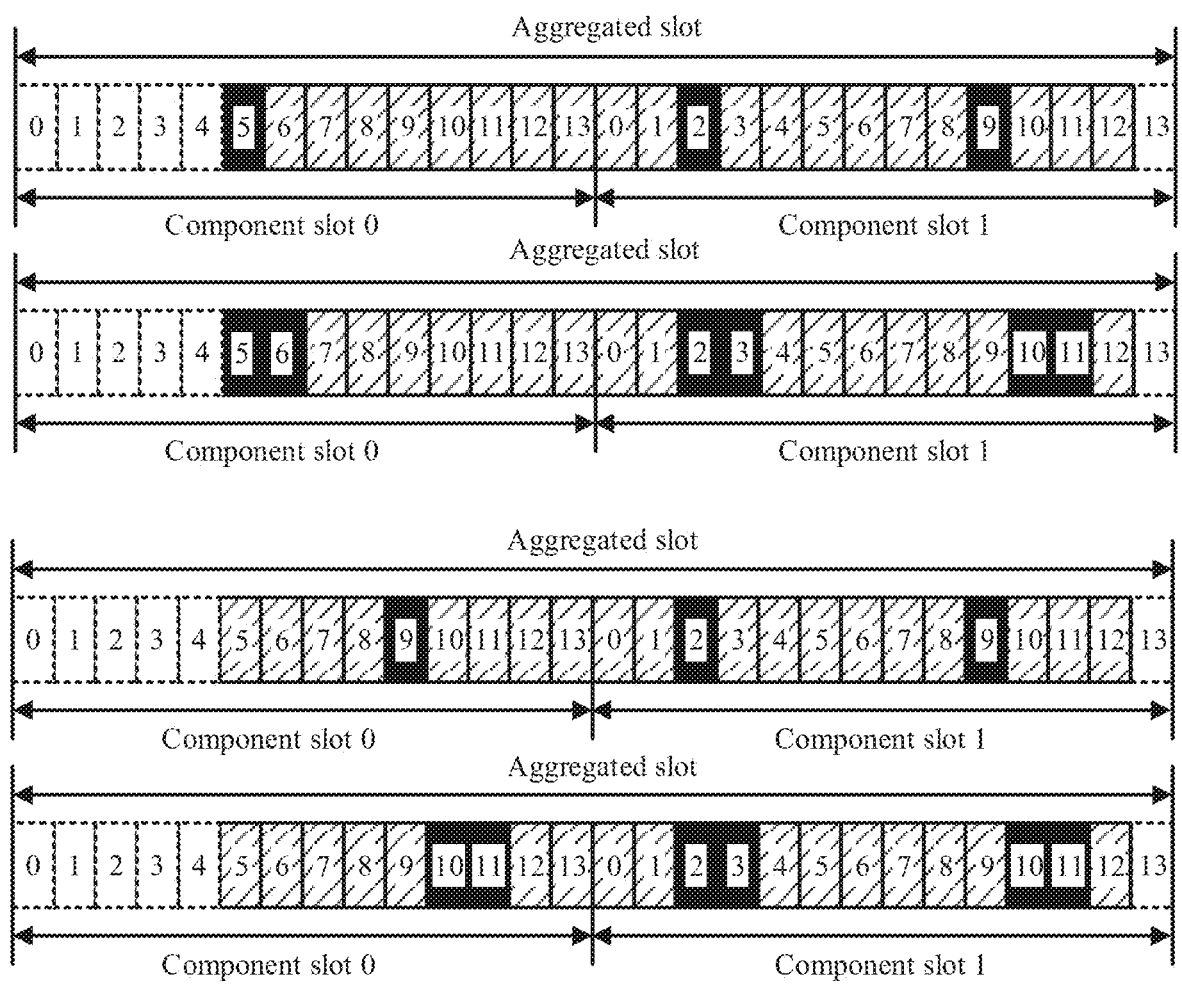

The $1^{st}$ row to the $6^{th}$ row in FIG. 8A to FIG. 8C are a case of a front-loaded only DMRS, that is, one component slot includes only one DMRS symbol or a plurality of consecutive DMRS symbols. The $7^{th}$ row to the $10^{th}$ row are cases in which there is an additional DMRS, that is, in addition to one or two consecutive front-loaded DMRSs, a plurality of additional DMRS symbols may be included.

In the $1^{st}$ row and the $2^{nd}$ row in FIG. 8A to FIG. 8C, as shown in FIG. 8A to FIG. 8C, a DMRS start symbol is placed in the first available symbol of a component slot 0, for example, a symbol 5 of the component slot 0 shown in FIG. 8A to FIG. 8C. In the $2^{nd}$ row, the component slot 0 may include a group of DMRS symbols (two consecutive DMRS symbols). In this example, one aggregated slot includes only one DMRS symbol or one group of (two) DMRS symbols. Therefore, DMRS overheads are few, and the backhaul link has a higher spectral efficiency. In addition, the DMRS symbol is located at a slot head, so that the first node can perform data demodulation quickly.

Alternatively, in the $3^{rd}$ row and the $4^{th}$ row in FIG. 8A to FIG. 8C, a DMRS start symbol is placed at a normal DMRS start position in a component slot 1, that is, a symbol 2 of the component slot 1. In the $4^{th}$ row, the component slot 1 may include two consecutive DMRS symbols. In this embodiment of this application, the normal DMRS position is a DMRS symbol start position configured by the network device or a parent node for the first node and/or the UE. Specially, the DMRS position corresponds to time domain resource mapping that is based on slot (slot-based) scheduling, that is, a time domain mapping type A of a PDSCH or a PUSCH in NR. For example, the normal DMRS position may be indicated by using configuration signaling dmrs-TypeA-Position in NR. In this example, one aggregated slot includes only one DMRS symbol or one group of (two) DMRS symbols. Therefore, DMRS overheads are few, and the backhaul link has a higher spectral efficiency. In addition, because the DMRS symbol is located at the normal DMRS position, the IAB node can share the DMRS symbol with the UE, to implement spatial multiplexing.

Alternatively, in the $5^{th}$ row and the $6^{th}$ row in FIG. 8A to FIG. 8C, a DMRS start position symbol is placed in the first available symbol for backhaul in the component slot 0, and a DMRS symbol is placed in the normal DMRS start position in the component slot 1. In the $6^{th}$ row, the component slot 0 may include two consecutive DMRS symbols, and the component slot 1 may also include two consecutive DMRS symbols. In this example, there are more DMRS symbols, so that better channel estimation performance can be achieved.

The following are the cases in which there is an additional DMRS. Herein, it is assumed that there is only one group of (one or two) additional DMRS symbols, and a start symbol is a symbol 9 (single DMRS symbol) or a symbol 10 (two DMRS symbols). Details are as follows:

In the $7^{th}$ row and the $8^{th}$ row in FIG. 8A to FIG. 8C, the component slot 0 includes only a front-loaded DMRS. The component slot 1 not only includes a front-loaded DMRS symbol, but also includes an additional DMRS. In the $8^{th}$ row, the component slot 0 may include two consecutive DMRS symbols. The component slot 1 may also include two consecutive front-loaded DMRS symbols and two consecutive additional DMRS symbols.

Alternatively, in the $9^{th}$ row and the $10^{th}$ row in FIG. 8A to FIG. 8C, the component slot 0 includes only an additional DMRS. The component slot 1 not only includes a front-loaded DMRS symbol, but also includes an additional DMRS. In the $10^{th}$ row, the component slot 0 may include two consecutive front-loaded DMRS symbols and two consecutive additional DMRS symbols. The component slot 1 may include two consecutive DMRS symbols. In the example of the $7^{th}$ row to the $10^{th}$ row, there are more DMRS symbols, so that better channel estimation performance can be achieved.

It should be understood that a quantity of consecutive DMRS symbols in FIG. 8A to FIG. 8C is not limited in embodiments of this application, and an example of two consecutive DMRS symbols is used merely for description in FIG. 8A to FIG. 8C. A person skilled in the art may flexibly adjust a DMRS symbol position and/or a quantity of consecutive DMRS symbols based on the example in FIG. 8A to FIG. 8C, and all shall fall within the protection scope of the embodiments of this application.

It should be further understood that the example in FIG. 8A to FIG. 8C is merely used for description herein, and constitutes no limitation on embodiments of this application. Optionally, in an example embodiment, a number of a start position symbol of the component slot 0 is not greater than a number of a normal DMRS start position symbol. Specifically, the following implementations are included: 1. A DMRS symbol is independently configured in each component slot. 2. A DMRS symbol is configured only in the component slot 0. 3. A front-loaded DMRS is configured in the component slot 0, and an additional DMRS is configured in a subsequent component slot.

The foregoing backhaul resource configuration manner is also applicable to a special slot, for example, a synchronization signal block (SSB) slot, to improve resource utilization when the SSB is sent. Herein, the SSB is short for an SS/PBCH (synchronization signal/physical broadcast channel) block, and the SSB slot represents a slot used by the first node to send the SSB. Generally, in a high frequency band, there are 64 candidate SSB positions within an interval of 5 milliseconds (ms). In other words, the first node or the network device may send a maximum of 64 SSBs within 5 ms.

Optionally, in an embodiment, the second backhaul resource includes a slot used by the first node to send a synchronization signal block (SSB).

Figure 9:
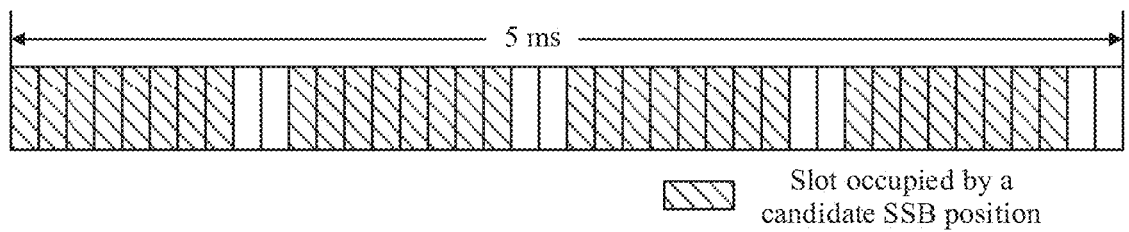
FIG. 9 is a schematic diagram of a candidate SSB position within 5 ms.
Figure 10:
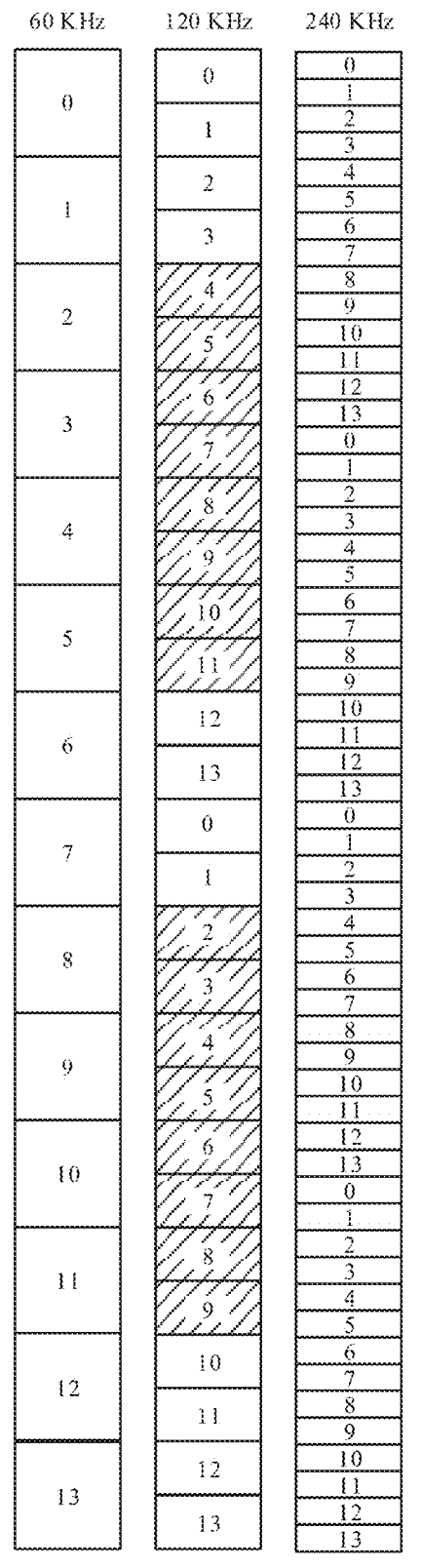
Figure 11:
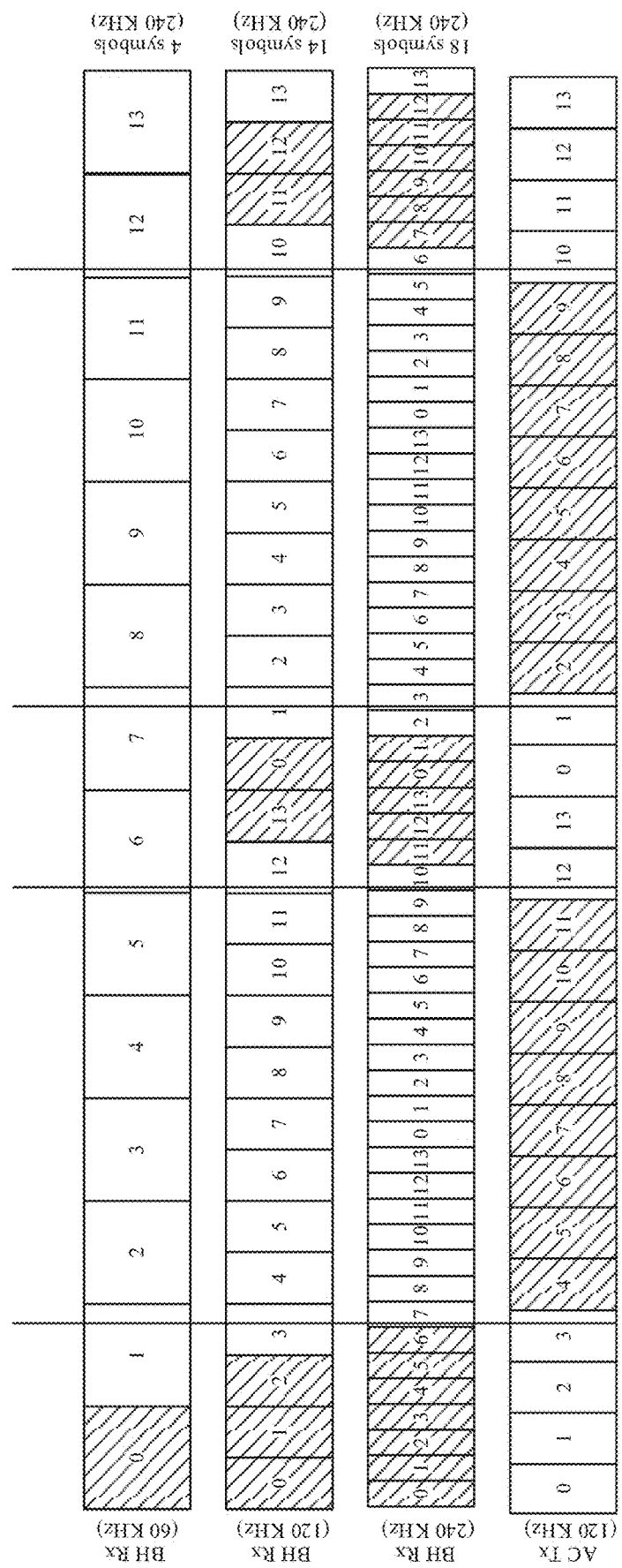
FIG. 11 is a schematic diagram of available symbols of a backhaul link at different subcarrier spacings.

For ease of understanding, description is provided with reference to schematic diagrams in FIG. 9 to FIG. 11.

FIG. 9 shows slots occupied by candidate SSB positions within 5 ms. As shown in FIG. 9, in 40 slots, 32 slots include a candidate SSB position (a slot with a SSB candidate). Because data backhaul has a relatively high latency requirement, and a slot that does not include an SSB may need to be used for uplink transmission, the first node is very likely to receive downlink backhauled data in an SSB slot.

FIG. 10 shows backhaul resource configuration at different subcarrier spacings. The 1st column is a backhaul resource configuration that is based on 60 kHz, the $2^{nd}$ column is a backhaul resource configuration that is based on 120 kHz, and the $3^{rd}$ column is a backhaul resource configuration that is based on 240 kHz. Two consecutive 120 kHz SSB slots may correspond to one 60 kHz slot or four 240 kHz slots in time domain. In FIG. 10, for symbols in a shaded part in symbols in the $2^{nd}$ column, four symbols form one candidate SSB position. For example, a symbol 4, a symbol 5, a symbol 6, and a symbol 7 form one candidate SSB position, a symbol 8, a symbol 9, a symbol 10, and a symbol 11 form another candidate SSB position, and so on. To be specific, a 120 kHz backhaul resource in FIG. 10 includes two SSB slots, each SSB slot further includes two candidate SSB positions, and there are a total of four candidate SSB positions.

If the first node needs to perform SSB sending at the foregoing four candidate SSB positions, and a transmit/receive conflict and a switching time are considered, quantities of available symbols for the backhaul link are different at different subcarrier spacings. FIG. 11 shows a quantity of available symbols for a backhaul link in an SSB slot at different subcarrier spacings. In this example, the first subcarrier spacing is 60 kHz. As shown in FIG. 11, if the second subcarrier spacing is 60 kHz, the first node may use only one symbol, for example, a symbol 0 in symbols in the 1st row in FIG. 11. If the second subcarrier spacing is 120 kHz and M=2, the first node may use seven symbols, for example, a symbol 0, a symbol 1, a symbol 2, and a symbol 13 in the first component slot in the 120 kHz backhaul resource and a symbol 0, a symbol 11, and a symbol 12 in the second component slot in the 120 kHz backhaul resource in FIG. 11. If the second subcarrier spacing is 240 kHz and M=4, the first node may use 18 symbols. It can be learned from FIG. 11 that as a subcarrier spacing increases, available resources for the backhaul link increase. When the backhaul resource is located in an SSB slot, when scheduling the first node, the parent node should avoid a symbol used by the first node to send an SSB and a switching symbol. For example, as shown in FIG. 11, when mapping a modulation symbol of a PDSCH, the parent node should avoid, in a time domain position, a symbol used by the first node to send an SSB and a switching symbol. In other words, the first node does not expect to receive the PDSCH by using the symbol for sending the SSB or the switching symbol.

It should be noted that, an example in which a subcarrier spacing is 120 kHz is used. In the foregoing example, it is assumed that the first node performs SSB sending at all candidate SSB positions in two slots. However, actually, the first node may perform SSB sending only at some candidate SSB positions. If the first node performs SSB sending only at some candidate SSB positions, the backhaul resource may occupy the candidate SSB positions used for sending an SSB. In an example embodiment, the parent node knows a candidate SSB position at which the first node performs SSB sending. In another embodiment, the first node reports, to the parent node, a candidate SSB position at which an SSB is sent.

It should be noted that, because a slot aggregation solution (that is, aggregating M component slots into one aggregated slot) in the embodiments of this application can obtain a larger gain in the SSB slot, during specific implementation, the slot aggregation solution may be used only for the SSB slot. In other words, the second backhaul resource may include only the SSB slot.

It should be understood that the examples in FIG. 5 to FIG. 11 are merely for helping a person skilled in the art understand the embodiments of this application, instead of limiting the embodiments of this application to specific scenarios shown in the examples. Clearly, a person skilled in the art can make various equivalent modifications or changes based on the examples shown in FIG. 5 to FIG. 11, and such modifications or changes also fall within the scope of the embodiments of this application.

It should further be understood that the solutions in the embodiments of this application may be properly combined, and explanation or description of the terms in the embodiments may be cited or explained in the embodiments. This is not limited in embodiments of this application.

It should further be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing describes in detail the data transmission method according to the embodiments of this application with reference to FIG. 1 to FIG. 11. The following describes a data transmission apparatus according to embodiments of this application with reference to FIG. 12 to FIG. 15. It should be understood that the technical features described in the method embodiments are also applicable to the following apparatus embodiments.

Figure 12:
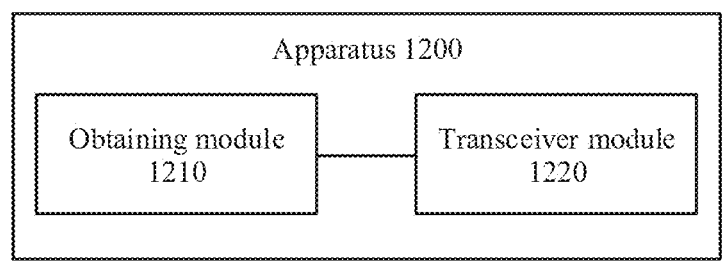
FIG. 12 is a schematic block diagram of a data transmission apparatus according to an embodiment of this application.

FIG. 12 is a schematic block diagram of a data transmission apparatus 1200 according to an embodiment of this application. The apparatus 1200 is configured to perform the method performed by the first node in the foregoing method embodiments. Optionally, a specific form of the apparatus 1200 may be a relay node or a chip in a relay node. This is not limited in embodiments of this application. The apparatus 1200 includes:

an obtaining module 1210, configured to obtain reference information, where the reference information includes information about a first subcarrier spacing and information about a first backhaul resource; and a transceiver module 1220, configured to transmit data on a second backhaul resource by using a second subcarrier spacing, where the second backhaul resource includes one or more sub-resources, each sub-resource includes M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource.

Optionally, M is less than or equal to a ratio of the second subcarrier spacing to the first subcarrier spacing.

In an optional implementation, the sub-resource includes one or more time resources used for transmitting a demodulation reference signal (DMRS). The transceiver module 1220 is further configured to:

send the DMRS on the one or more time resources used for transmitting the DMRS.

In an optional implementation, the one or more time resources used for transmitting the DMRS start from the $1^{st}$ available symbol of the sub-resource, and the available symbol is a symbol that can be used for transmitting data or a signal.

In an optional implementation, that the obtaining module 1210 is configured to obtain reference information includes:

receiving the reference information from a second node.

In an optional implementation, the reference information further includes an indication of a period of the first backhaul resource and an indication of a time domain position of the first backhaul resource.

Optionally, the first subcarrier spacing is carried in time division duplex (TDD) uplink and downlink configuration signaling.

In an optional implementation, the second backhaul resource includes a slot used by the first node to send a synchronization signal block (SSB).

In an optional implementation, a subcarrier spacing used for communication between the first node and a child node of the first node is greater than or equal to the first subcarrier spacing.

In an optional implementation, the transceiver module 1220 is further configured to:

send the information about the first subcarrier spacing to a parent node of the first node.

It should be understood that the data transmission apparatus 1200 according to this embodiment may correspond to the method performed by the first node in the foregoing method embodiments, for example, the method in FIG. 4. In addition, the foregoing and other management operations and/or functions of the modules in the apparatus 1200 are respectively used to implement corresponding steps of the methods performed by the first node in the foregoing method embodiments. Therefore, beneficial effects in the foregoing method embodiments may also be implemented.

It should further be understood that the modules in the apparatus 1200 may be implemented in a form of software and/or hardware. This is not specifically limited. In other words, the apparatus 1200 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in another embodiment, a person skilled in the art may figure out that the apparatus 1200 may be in a form shown in FIG. 13. The obtaining module 1210 may be implemented by using a processor 1301 shown in FIG. 13. The transceiver module 1220 may be implemented by using a transceiver 1303 shown in FIG. 13. Specifically, the processor is implemented by executing a computer program stored in a memory. Optionally, when the apparatus 1200 is a chip, a function and/or an implementation process of the transceiver module 1210 may alternatively be implemented by using a pin, a circuit, or the like. Optionally, the memory is a storage unit in the chip, for example, a register or a cache. The storage unit may alternatively be a storage unit that is in a computer device and that is located outside the chip, for example, a memory 1302 shown in FIG. 13.

Figure 13:
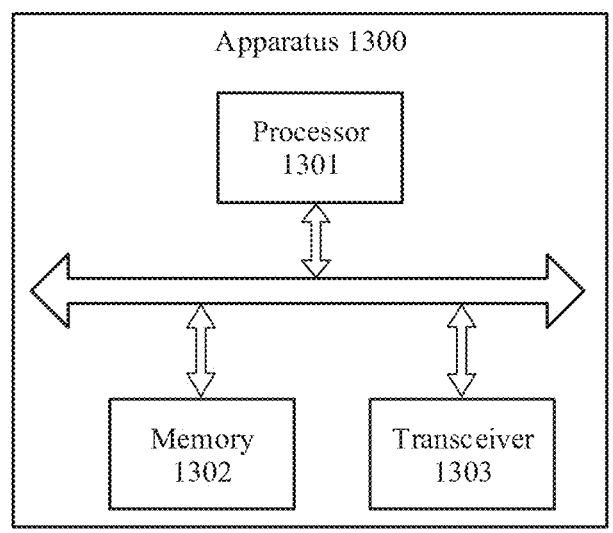
FIG. 13 is a schematic structural diagram of a data transmission apparatus according to an embodiment of this application.

FIG. 13 is a schematic structural diagram of a data transmission apparatus 1300 according to an embodiment of this application. As shown in FIG. 13, the apparatus 1300 includes a processor 1301.

In an example embodiment, the processor 1301 is configured to invoke an interface to perform the following actions: obtaining reference information, where the reference information includes resource configuration information of a first subcarrier spacing and resource configuration information of a first backhaul resource; and transmitting data on a second backhaul resource by using a second subcarrier spacing, where the second backhaul resource includes one or more sub-resources, each sub-resource includes M resource units, M is an integer greater than 1, M is determined based on the first subcarrier spacing and the second subcarrier spacing, the second subcarrier spacing is greater than the first subcarrier spacing, and a time domain resource corresponding to the second backhaul resource is a subset of a time domain resource indicated by the resource configuration information of the first backhaul resource.

It should be understood that the processor 1301 may invoke the interface to perform the foregoing receiving and sending actions. The invoked interface may be a logical interface or a physical interface. This is not limited in embodiments of the present disclosure. Optionally, the physical interface may be implemented by using a transceiver. Optionally, the apparatus 1300 further includes a transceiver 1303.

Optionally, the apparatus 1300 further includes a memory 1302, and the memory 1302 may store program code in the foregoing method embodiments, so that the processor 1301 invokes the program code.

Specifically, if the apparatus 1300 includes the processor 1301, the memory 1302, and the transceiver 1303, the processor 1301, the memory 1302, and the transceiver 1303 communicate with each other through an inner connection path, to transmit a control signal and/or a data signal. In an embodiment, the processor 1301, the memory 1302, and the transceiver 1303 may be implemented by using a chip. The processor 1301, the memory 1302, and the transceiver 1303 may be implemented in a same chip, or may be separately implemented in different chips, or functions of any two of the processor 1301, the memory 1302, and the transceiver 1303 are implemented in one chip. The memory 1302 may store the program code, and the processor 1301 invokes the program code stored in the memory 1302, to implement a corresponding function of the apparatus 1300.

It should be understood that the apparatus 1300 may further be configured to perform other steps and/or operations on a first node side in the foregoing embodiments.

Figure 14:
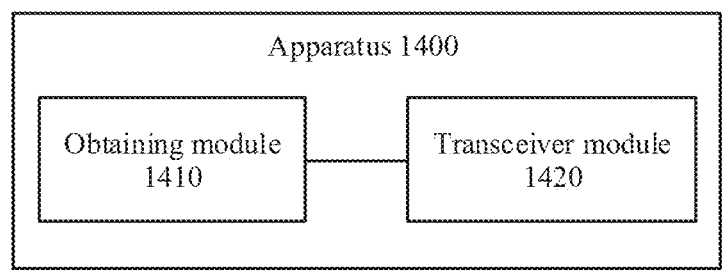
FIG. 14 is a schematic block diagram of a data transmission apparatus according to another embodiment of this application.

FIG. 14 is a schematic block diagram of a data transmission apparatus 1400 according to an embodiment of this application. The apparatus 1400 is configured to perform the method performed by the second node in the foregoing method embodiments. Optionally, a specific form of the apparatus 1400 may be a relay node or a chip in a relay node. This is not limited in embodiments of this application. The apparatus 1400 includes:

an obtaining module 1410, configured to obtain information about a first backhaul resource; and a transceiver module 1420, configured to send reference information to a first node, where the reference information includes information about a first subcarrier spacing and the information about the first backhaul resource, the reference information is used to determine a second backhaul resource used by the first node to transmit data, the second backhaul resource includes one or more sub-resources, each sub-resource includes M resource units, M is an integer greater than 1, M is determined based on the first subcarrier spacing and a second subcarrier spacing, the second subcarrier spacing is greater than the first subcarrier spacing, and the second backhaul resource is a subset of the first backhaul resource.

Optionally, the reference information further includes an indication of a period of the first backhaul resource and an indication of a time domain position of the first backhaul resource.

Optionally, the transceiver module 1420 is further configured to transmit data with the first node on the second backhaul resource.

It should be understood that the data transmission apparatus 1400 according to this embodiment of this application may correspond to the method performed by the second node in the foregoing method embodiments, for example, the method in FIG. 4. In addition, the foregoing and other management operations and/or functions of the modules in the apparatus 1400 are respectively used to implement corresponding steps of the methods performed by the second node in the foregoing method embodiments. Therefore, beneficial effects in the foregoing method embodiments may also be implemented.

It should further be understood that the modules in the apparatus 1400 may be implemented in a form of software and/or hardware. This is not specifically limited in embodiments of the application. In other words, the apparatus 1400 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 1400 may be in a form shown in FIG. 15. The obtaining module 1410 may be implemented by using a processor 1501 shown in FIG. 15. The transceiver module 1420 may be implemented by using a transceiver 1503 shown in FIG. 15. Specifically, the processor is implemented by executing a computer program stored in the memory. Optionally, when the apparatus 1400 is a chip, a function and/or an implementation process of the transceiver module 1410 may alternatively be implemented by using a pin, a circuit, or the like. Optionally, the memory is a storage unit in the chip, for example, a register or a cache. The storage unit may alternatively be a storage unit that is in a computer device and that is located outside the chip, for example, a memory 1502 shown in FIG. 15.

Figure 15:
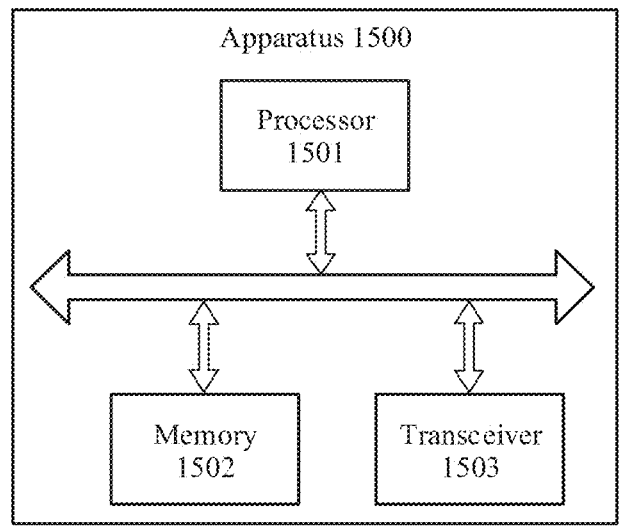
FIG. 15 is a schematic structural diagram of a data transmission apparatus according to another embodiment of this application.

FIG. 15 is a schematic structural diagram of a data transmission apparatus 1500 according to an embodiment of this application. As shown in FIG. 15, the apparatus 1500 includes a processor 1501.

In an example embodiment, the processor 1501 is configured to invoke an interface to perform the following operations comprising: obtaining resource configuration information of a first backhaul resource; and sending reference information to a second node, where the reference information includes resource configuration information of a first subcarrier spacing and the resource configuration information of the first backhaul resource.

It should be understood that the processor 1501 may invoke the interface to perform the foregoing receiving and sending operations. The invoked interface may be a logical interface or a physical interface. This is not limited in embodiments of the present disclosure. Optionally, the physical interface may be implemented by using a transceiver. Optionally, the apparatus 1500 further includes a transceiver 1503.

Optionally, the apparatus 1500 further includes a memory 1502, and the memory 1502 may store program code in the foregoing method embodiments, so that the processor 1501 invokes the program code.

Specifically, if the apparatus 1500 includes the processor 1501, the memory 1502, and the transceiver 1503, the processor 1501, the memory 1502, and the transceiver 1503 communicate with each other through an inner connection path, to transmit a control signal and/or a data signal. In an embodiment, the processor 1501, the memory 1502, and the transceiver 1503 may be implemented by using a chip. The processor 1501, the memory 1502, and the transceiver 1503 may be implemented in a same chip, or may be separately implemented in different chips, or functions of any two of the processor 1501, the memory 1502, and the transceiver 1503 are implemented in one chip. The memory 1502 may store the program code, and the processor 1501 invokes the program code stored in the memory 1502, to implement a corresponding function of the apparatus 1500.

It should be understood that the apparatus 1500 may further be configured to perform other steps and/or operations on a second node side in the foregoing embodiments.

The method disclosed in the embodiments of this application may be applied to a processor or may be implemented by a processor. The processor may be an integrated circuit chip and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processor (DSP), a micro controller unit (MCU), a programmable controller (or programmable logic device, PLD), or another integrated chip. The processor may implement or perform the methods, steps, and logical block diagrams that are disclosed in the embodiments of this application. The general-purpose processor may be a microprocessor, or the processor may be any conventional processor, or the like. Steps of the methods disclosed with reference to the embodiments of this application may be directly executed and accomplished by using a hardware decoding processor, or may be executed and accomplished by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Examples but not limitative description is provided herein. Many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in each of the systems and methods described in this specification includes but is not limited to these types of memories and any memory of another proper type.

It should be understood that in the embodiments of the present invention, numbers "first", "second", and the like are merely used to distinguish between different objects, for example, to distinguish between different nodes or resources, and do not constitute a limitation on the scope of the embodiments of this application. The embodiments of this application are not limited thereto.

It should further be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for detailed working processes of the foregoing system, apparatus, and unit, refer to corresponding processes in the foregoing method embodiments, and details are not repeated herein.

In the embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing description describes merely non-limiting examples of specific implementations, and are not intended to limit the protection scope, which is intended to cover any variation or replacement readily determined by a person of ordinary skill in the art. Therefore, the claims shall define the protection scope.

What is claimed is:

1. A data transmission method, comprising:
obtaining, by a first node, reference information, wherein the reference information comprises information about a first subcarrier spacing and information about a first backhaul resource, wherein the information about the first subcarrier spacing is carried in time division duplex (TDD) uplink and downlink configuration signaling;
receiving, by the first node, indication information from a second node, wherein the second node is a parent node of the first node, and the indication information indicates, using a configuration of at least one of an uplink bandwidth part (BWP) or a downlink BWP configured by the second node for the first node, a second subcarrier spacing used for actual data transmission between the first node and the second node; and
transmitting, by the first node, data on a second backhaul resource by using the second subcarrier spacing, wherein the second backhaul resource comprises one or more sub-resources, each of the one or more sub-resources comprising M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource,
wherein the uplink bandwidth part (BWP) indicates that the second subcarrier spacing is used for a physical uplink shared channel (PUSCH) or the downlink BWP indicates that the second subcarrier spacing is used for a Physical Downlink Shared Channel (PDSCH).

2. The data transmission method according to claim 1, wherein M is less than or equal to a ratio of the second subcarrier spacing to the first subcarrier spacing.

3. The data transmission method according to claim 1, wherein each of the one or more the sub-resources comprises one or more time resources for transmitting a demodulation reference signal (DMRS), and the method further comprises:
sending, by the first node, the DMRS on the one or more time resources.

4. The data transmission method according to claim 3, wherein the one or more time resources of the sub-resource for transmitting the DMRS start from a first available symbol among one or more available symbols of the sub-resource, and each of the one or more available symbols is a symbol that can be used for transmitting data or a signal.

5. The data transmission method according to claim 1, wherein obtaining the reference information comprises:
receiving, by the first node, the reference information from the second node.

6. The data transmission method according to claim 1, wherein the reference information further comprises an indication of a period of the first backhaul resource and an indication of a time domain position of the first backhaul resource.

7. The data transmission method according to claim 1, wherein a subcarrier spacing for communication between the first node and a child node of the first node is greater than or equal to the first subcarrier spacing.

8. The data transmission method according to claim 1, wherein the first node is a relay node supporting integrated access and backhaul (IAB) node.

9. A data transmission method, comprising:
obtaining, by a second node, information about a first backhaul resource; and
sending, by the second node, reference information to a first node, wherein the reference information comprises information about a first subcarrier spacing and the information about the first backhaul resource, and the information about the first subcarrier spacing is carried in time division duplex (TDD) uplink and downlink configuration signaling,
sending, by the second node, indication information from the second node, wherein the second node is a parent node of the first node, and the indication information indicates, using a configuration of at least one of an uplink bandwidth part (BWP) or a downlink BWP configured by the second node for the first node, a second subcarrier spacing used for actual data transmission between the first node and the second node,
wherein a second backhaul resource used by the first node to transmit data is determined by using the reference information, the second backhaul resource comprises one or more sub-resources, each of the one or more sub-resources comprising M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource,
wherein the uplink bandwidth part (BWP) indicates that the second subcarrier spacing is used for a physical uplink shared channel (PUSCH) or the downlink BWP indicates that the second subcarrier spacing is used for a Physical Downlink Shared Channel (PDSCH).

10. The data transmission method according to claim 9, further comprising:
transmitting, by the second node, data to the first node on the second backhaul resource.

11. The data transmission method according to claim 9, wherein the reference information further comprises an indication of a period of the first backhaul resource and an indication of a time domain position of the first backhaul resource.

12. A data transmission apparatus, comprising at least one processor
configured to obtain reference information, wherein the reference information comprises information about a first subcarrier spacing and information about a first backhaul resource, and the information about the first subcarrier spacing is carried in time division duplex (TDD) uplink and downlink configuration signaling; and
a transceiver configured to
receive indication information from a second node, wherein the second node is a parent node of the data transmission apparatus, and the indication information indicates, using a configuration of at least one of an uplink bandwidth part (BWP) or a downlink BWP configured by the second node for the data transmission apparatus, a second subcarrier spacing used for actual data transmission between the data transmission apparatus and the second node; and
transmit data on a second backhaul resource by using the second subcarrier spacing, wherein the second backhaul resource comprises one or more sub-resources, each of the one or more sub-resources comprising M resource units, M is an integer greater than 1, M is determined based on the first subcarrier spacing and the second subcarrier spacing, the second subcarrier spacing is greater than the first subcarrier spacing, and the second backhaul resource is a subset of the first backhaul resource,
wherein the uplink bandwidth part (BWP) indicates that the second subcarrier spacing is used for a physical uplink shared channel (PUSCH) or the downlink BWP indicates that the second subcarrier spacing is used for a Physical Downlink Shared Channel (PDSCH).

13. The data transmission apparatus according to claim 12, wherein M is less than or equal to a ratio of the second subcarrier spacing to the first subcarrier spacing.

14. The data transmission apparatus according to claim 12, wherein each of the one or more sub-resources comprises one or more time resources for transmitting a demodulation reference signal (DMRS), and the transceiver is further configured to:
send the DMRS on the one or more time resources.

15. The data transmission apparatus according to claim 14, wherein the one or more time resources of the sub-resource for transmitting the DMRS start from a first available symbol among one or more available symbols of the sub-resource, and each of the one or more available symbols is a symbol that can be used for transmitting data or a signal.

16. The data transmission apparatus according to claim 12, wherein that the at least one processor is further configured to:
receive the reference information from the second node.

17. The data transmission apparatus according to claim 12, wherein the reference information further comprises an indication of a period of the first backhaul resource and an indication of a time domain position of the first backhaul resource.

18. The data transmission apparatus according to claim 12, wherein a subcarrier spacing for communication between the data transmission apparatus and a child node of the data transmission apparatus is greater than or equal to the first subcarrier spacing.

* * * * *

UNITED STATES PATENT AND TRADEMARK OFFICE
CERTIFICATE OF CORRECTION

PATENT NO. : 12,041,006 B2
APPLICATION NO. : 17/213484
DATED : July 16, 2024
INVENTOR(S) : Fengwei Liu It is certified that error appears in the above-identified patent and that said Letters Patent is hereby corrected as shown below:

In the Specification

Column 26, Line 31, change "'I'" to --"/"--.

Signed and Sealed this
Thirteenth Day of August, 2024

Katherine Kelly Vidal
*Director of the United States Patent and Trademark Office*